US008264739B2

(12) United States Patent
Yamanouchi

(10) Patent No.: US 8,264,739 B2
(45) Date of Patent: Sep. 11, 2012

(54) PRINT CONTROLLING SYSTEM EXTRACTING IMAGE DATA INSIDE PRINT REGION WHEN PAGE SIZE AND RECORD MEDIUM SIZE AGREE

(75) Inventor: Katsuyoshi Yamanouchi, Fukushima-ken (JP)

(73) Assignee: Oki Data Corporation, Tokyo (JP)

(*) Notice: Subject to any disclaimer, the term of this patent is extended or adjusted under 35 U.S.C. 154(b) by 835 days.

(21) Appl. No.: 12/413,614

(22) Filed: Mar. 30, 2009

(65) Prior Publication Data
US 2009/0244554 A1 Oct. 1, 2009

(30) Foreign Application Priority Data

Apr. 1, 2008 (JP) .................. 2008-095043

(51) Int. Cl.
*H04N 1/387* (2006.01)
*H04N 1/393* (2006.01)
*G06K 15/02* (2006.01)

(52) U.S. Cl. ........ 358/1.2; 358/1.18; 358/449; 358/451; 358/452; 358/453

(58) Field of Classification Search .................. 358/1.2, 358/1.9, 1.18, 528, 537, 538, 449, 451, 452, 358/453
See application file for complete search history.

(56) References Cited

U.S. PATENT DOCUMENTS

| | | | | |
|---|---|---|---|---|
| 5,566,004 | A | * | 10/1996 | Imaizumi et al. ............. 358/449 |
| 6,456,732 | B1 | * | 9/2002 | Kimbell et al. ............... 358/449 |
| 7,548,339 | B2 | * | 6/2009 | Imai et al. .................... 358/1.18 |
| 2001/0043359 | A1 | | 11/2001 | Mori et al. |
| 2004/0165209 | A1 | | 8/2004 | Aoki et al. |
| 2005/0157344 | A1 | * | 7/2005 | Nagashima .................. 358/1.18 |

FOREIGN PATENT DOCUMENTS

| | | |
|---|---|---|
| JP | 2003208279 A | 7/2003 |
| JP | 2004195972 A | 7/2004 |
| JP | 2007-257592 A | 10/2007 |

OTHER PUBLICATIONS

Office Action issued Jul. 6, 2010 in JP Appln. Ser. No. 2008-095043.

* cited by examiner

*Primary Examiner* — Scott A Rogers
(74) *Attorney, Agent, or Firm* — Panitch Schwarze Belisario & Nadel LLP

(57) ABSTRACT

A print controlling apparatus is supplied capable of adjusting image of electronic document to an optimum size. In the print controlling apparatus which includes an inputting section for inputting image data of electronic document and an expanding section for expanding the inputted image data into print data, and is used for printing the electronic document onto record medium, a first obtaining section obtains page size information representing page size of the electronic document; a second obtaining section obtains medium size information representing medium size of the record medium; a comparing and judging section compares the page size information with the medium size information, and judges whether the two size information are coincident; and when the two size information are coincident, an extracting section extracts image data inside of region corresponding to print region of the record medium from the image data, wherein the expanding section expands the extracted image data inside of region and generates print data inside of region corresponding to the print region.

15 Claims, 23 Drawing Sheets

```
%PDF-.....
...
endstream
endobj
8 0 obj<</FICL:Enfocus 2 0 R/Metadata 3 0 R/Pages 1 0
R/Type/Catalog>>
endobj
9 0 obj<</CropBox[0.0 0.0 595.44 841.68 ]/Parent 1 0
R/Rotate 0/MediaBox[0.0 0.0 595.44
841.68]/Resources<<>>/Type/Page>>
endobj
1 0 obj<</Count 1/Type/Pages/Kids[9 0 R]>>
endobj
...
...
```

*FIG. 2*

| PAPER DISTINGUISHMENT NUMBER | PAPER SIZE | | PRINT REGION | |
|---|---|---|---|---|
| | WIDTHWISE SIZE | LENGTHWISE SIZE | WIDTHWISE SIZE | LENGTHWISE SIZE |
| 0x00 | 595 | 420 | 575 | 400 |
| 0x01 | 595 | 842 | 575 | 822 |
| ... | ... | ... | ... | ... |

*FIG. 4*

PRINT CONTROLLING SYSTEM EXTRACTING IMAGE DATA INSIDE PRINT REGION WHEN PAGE SIZE AND RECORD MEDIUM SIZE AGREE

BACKGROUND OF THE INVENTION

1. Field of the Invention

The invention relates to a print controlling apparatus for controlling a direct print of electronic document.

2. Related Background Art

A print processing system is well known that is composed of an upper apparatus such as personal computer or the like, and a printing apparatus such as printer or the like that is connected to the upper apparatus. In the print processing system, in order to print electronic document such as PDF (Portable Document Format) file that is made by application, usually, printer driver is used in the upper apparatus.

The printer driver is software that operates in the upper apparatus for changing the electronic document serving as print object into Page Description Language (PDL) that can be interpreted by the printing apparatus. In the upper apparatus, after a print is instructed, the printer driver sets medium size of record medium used in printing, magnification/reduction rate of image and the like; changes the electronic document into PDL data; and sends the PDL data to the printing apparatus.

Then, the printing apparatus, after interpreted the received PDL data and expanded it into the print image data, performs print with respect to every page by using record medium whose medium size was set. That is, the printing apparatus forms respective print images in print regions of respective record mediums so as to execute printing process.

However, in such method of the printing process using the printer driver stated above, because the electronic document must be changed into PDL data in the upper apparatus, so there is a problem that it is necessary to spend a lot of time and labor.

In order to solve this kind of problem, in a patent document 1 mentioned below, a technology is disclosed that relates to a direct print function of printing apparatus that receives and prints electronic document from upper apparatus in an unchanged form. This kind of printing apparatus comprises a controller unit and a printing section that constitute a print controlling device.

The controller unit edits the electronic document that is received from the upper apparatus, expands it into print image data; and selects a record medium on the basis of the medium size that is designated by the application of the upper apparatus. Then, the printing section forms a print image in print region of record medium that was selected. Thus, the direct print of the electronic document is executed.

Patent document 1: Japan patent publication 2007-257592.

However, in the direct print of the printing apparatus stated above, until now, size of image of electronic document is adjusted so that page sizes (medium size region) of respective pages become region sizes of print regions of record mediums. Therefore, when record medium is used whose size is the same as page size (designation medium size) of electronic document, there is a problem that the image of electronic document will be reduced to correspond to region size of print region.

Therefore, a print controlling apparatus is desired capable of adjusting image of electronic document to an optimum size.

SUMMARY OF THE INVENTION

It is, therefore, an object of the invention to provide a print controlling apparatus capable of solving the above problem.

An aspect of the invention is to provide a print controlling apparatus which includes an inputting section for inputting image data of electronic document and an expanding section for expanding the inputted image data into print data, and is used for printing the electronic document onto record medium, comprising:

a first obtaining section that obtains page size information representing page size of the electronic document;

a second obtaining section that obtains medium size information representing medium size of the record medium;

a comparing and judging section that compares the page size information with the medium size information that were obtained, and judges whether or not the page size information agrees with the medium size information; and an extracting section that, when the page size information is judged to agree with the medium size information, extracts image data inside of region corresponding to print region of the record medium from the image data, wherein the expanding section expands the extracted image data inside of region, and generates print data inside of region corresponding to the print region.

Effect Of The Invention

According to the invention, when page size of electronic document (designation medium size) agrees with medium size of record medium, from image data of electronic document, image data inside of region that corresponds to print region of record medium is extracted, and is expanded into print data inside of region. Therefore, an unnecessary reduction of the electronic document is prevented, and it is possible to print in a desirable size, so that convenience is improved.

The above and other objects and features of the present invention will become apparent from the following detailed description and the appended claims with reference to the accompanying drawings.

BRIEF DESCRIPTION OF THE DRAWINGS

FIG. 2 is a diagram showing an example of PDF file;

FIG. 4 is an explanation diagram showing a structure of paper list table;

DETAILED DESCRIPTION OF THE PREFERRED EMBODIMENTS

Embodiments of the invention will be described in detail hereinbelow with reference to the drawings.

Here, it is to explain an example in the case that a print controlling apparatus of the present invention is applied to a controller section of a printer on which a direct print function is installed.

<Embodiment 1>

Figure 1:
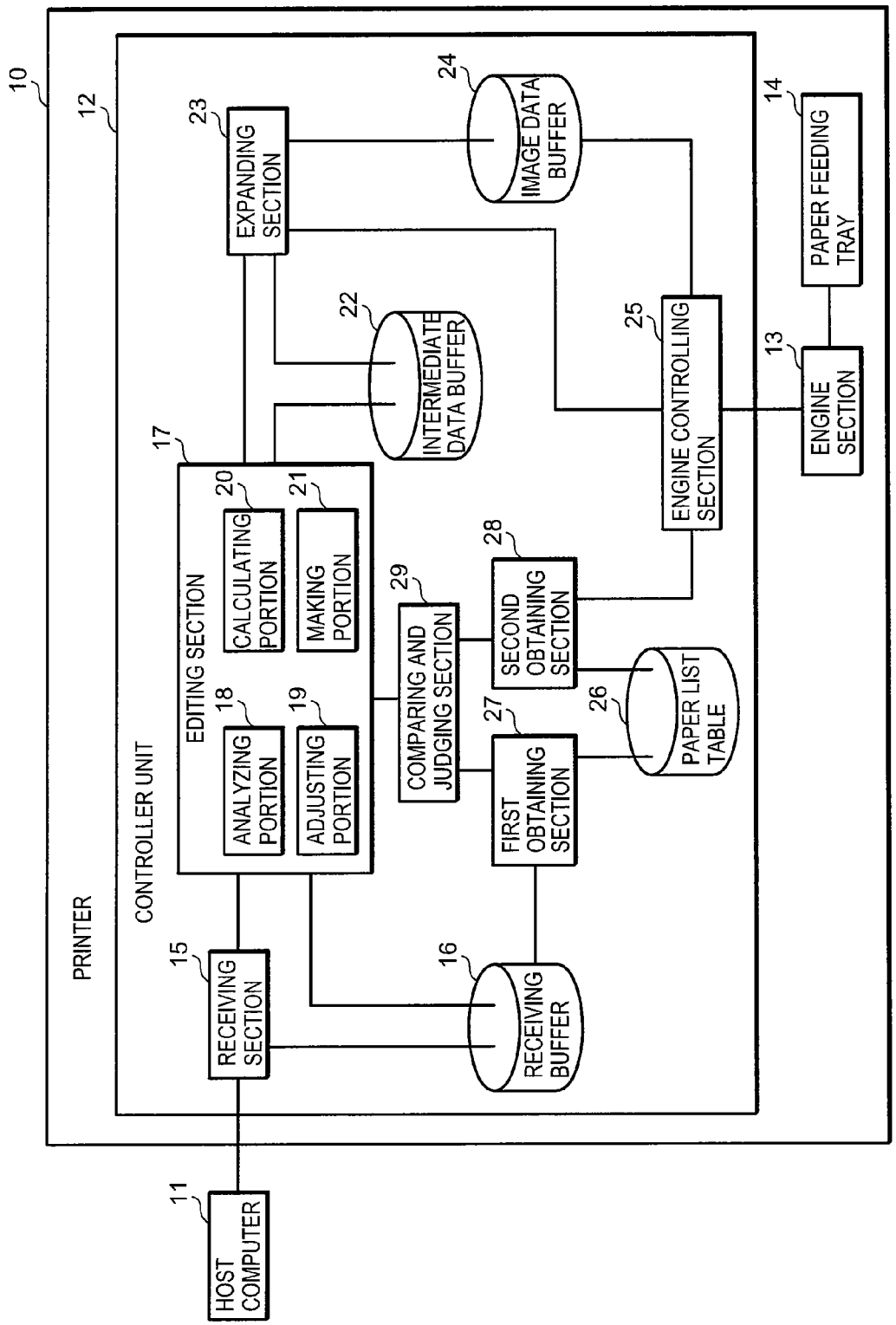
FIG. 1 is a block diagram showing a structure of a printer comprising a controller unit in embodiment 1 of the present invention.

FIG. 1 is a block diagram showing a structure of a printer comprising a controller unit in embodiment 1 of the present invention.

A printer 10 of the present embodiment is connected to a host computer 11, receives PDF (Portable Document Format) file from the host computer 11, and executes printing process.

The host computer 11, as shown by FIG. 1, is connected to the printer 10 as an upper apparatus. The host computer 11 has a function of making PDF file as electronic document to drive application.

FIG. 2 is a diagram showing an example of PDF file.

In the PDF file, one page part of image data at least, and information with respect to page setting in the case of scene displaying of the image data and printing are contained. For example, in the PDF file that is shown by FIG. 2, four numerical values "x1", "y1", "x2", "y2" as page information continues to letter row "/MediaBox", and is buried in a form of numerical value box "[x1 y1 x2 y2]".

Figure 3:
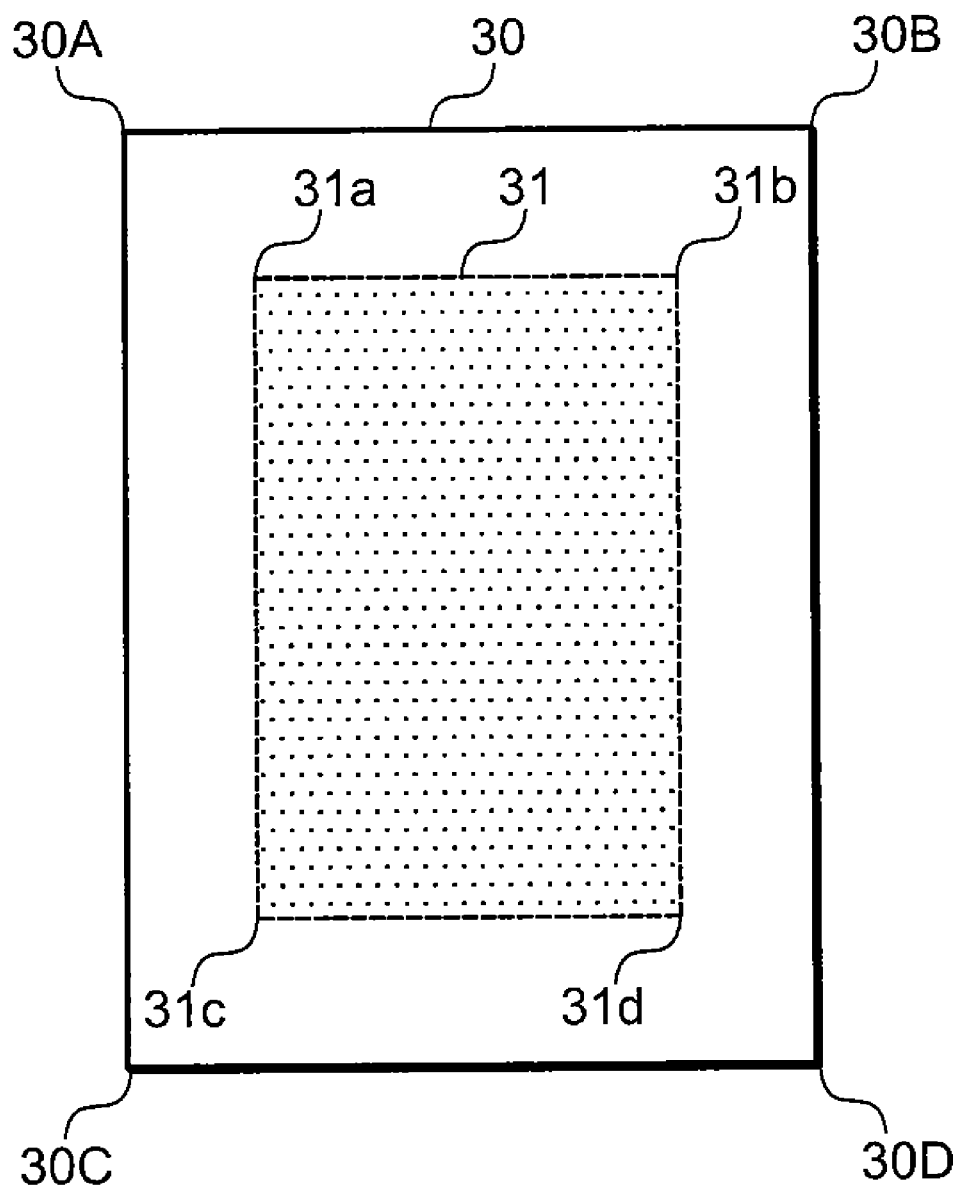
FIG. 3 is a diagram showing a displaying example of page image based on PDF file.

FIG. 3 is a diagram showing a displaying example of page image based on PDF file.

In the FIG. 3, a page image 30, for example, is displayed on a scene of the host computer 11 on the basis of image data that is contained in the PDF file.

The page image 30, as shown by FIG. 3, is formed from a rectangular region having four top points "30A", "30B", "30C" and "30D". In the page image 30, for example, when a straight line that connects the top point "30C" of the left and underneath with the top point "30D" of the right and underneath is regarded as x coordinate axis, and a straight line that connects the top point "30C" with the top point "30A" of the left and upper is regarded as y coordinate axis, the coordinate of the top point "30C" is displayed by (x1, y1)=(0, 0), and the coordinate of the top point "30B" is displayed by (x2, y2). That is, in the page image 30, the coordinate value of the top point "30C" of the left and underneath and the coordinate value of the top point "30B" of the right and upper are obtained as page information, and is buried in the PDF file.

These page information "x1", "y1", "x2" and "y2" are numerical values that are used in calculation of page size information representing page sizes of respective pages. The page size information is composed of page widthwise size information "x" representing page size of widthwise direction and page lengthwise size information "y" representing page size of lengthwise direction. The page widthwise size information "x" and the page lengthwise size information "y" are calculated on the basis of calculation formula x=x2−x1 and y=y2−y1 respectively. In the PDF file shown by FIG. 2, the page information x1=0.0, y1=0.0, x2=595.44 and y2=841.68 is buried, and then the page size information that is calculated on the basis of these becomes page widthwise size information x=595.44 and page lengthwise size information y=841.68.

Moreover, in the present embodiment, numerical value unit of respective page information and page size information is any of point, and the page size of the PDF file that is shown by FIG. 2 corresponds to A4 size.

Further, the host computer 11 is possible to perform the page setting in the case of printing process. Here, the page setting that is performed in the host computer 11 contains such as setting of paper using in printing process and setting of print region and the like. For example, in the page image 30 that is shown by FIG. 3, the rectangular region having four top points "30A", "30B", "30C" and "30D" prescribe a page size. Furthermore, in the FIG. 3, the rectangular region having four top points "30A", "30B", "30C" and "30D" is set as a setting region 31. When the setting region 31 is set as a print region in the host computer 11, the printer forms image in the setting region 31 in the page image 30, and executes printing process.

When this kind of page setting is performed, the host computer 11 regards the print region as setting region information that is set, and inputs coordinate (x3, y3) of left and underneath top point "31c" of the setting region 31 and coordinate (x4, y4) of right and upper top point "31b". These setting region information continues to letter row "/CropBox", and is buried in a form of numerical value box "[x3 y3 x4 y4]" in the PDF file that is shown by FIG. 2. Moreover, in the host computer 11, when the page setting is not performed, in the numerical value box continuing after the letter row "/CropBox", as shown by FIG. 2, four page information "x1", "x2", "x3" and "x4" is buried.

In the present embodiment, numerical value unit of setting region information is any of point.

The host computer 11 is also possible to perform page setting with respect to print size besides setting the print region stated above, but explanation is omitted in the present embodiment.

Furthermore, the host computer 11 generates a direct print instruction for instructing a direct print on the basis of an inputting from an inputting section (not shown). Then, the direct print instruction and the PDF file are sent to the printer 10.

The printer 10 is a print apparatus on which a direct print function is installed, as shown by FIG. 1, comprises a controller unit 12, an engine section 13 and a paper feeding tray 14.

The paper feeding tray 14 is installed on the engine section 13, and accommodates paper as record medium. In the present embodiment, one paper feeding tray 14 is installed on the engine section 13 of the printer 10.

The engine section 13 detects size of paper that is accommodated in the paper feeding tray 14 as fed-paper size on the basis of a size detection instruction (stated later) from the controller unit 12, and informs the controller unit 12 of the fed-paper size information representing the fed-paper size. Further, the engine section 13, after received a print instruction and print image data (stated later) from the controller unit 12, forms print image on the paper on the basis of the print image data; and executes a print.

The controller unit 12, as a print controlling apparatus of the present embodiment, as shown by FIG. 1, comprises a receiving section 15, a receiving buffer 16, a editing section 17, an intermediate data buffer 22, an expanding section 23, an image data buffer 24, an engine controlling section 25, a paper list table 26, a first obtaining section 27, a second obtaining section 28 and a comparing and judging section 29.

The receiving section 15 has a function of receiving direct print instruction and PDF file from the host computer 11. The receiving section 15 stores the received PDF file in the receiving buffer 16; and sends the received direct print instruction to the editing section 17.

The receiving buffer 16 is a temporarily storing section in which the received PDF file is temporarily stored by the receiving section 15.

The editing section 17, as shown by FIG. 1, has an analyzing portion 10, an adjusting portion 19, a calculating portion 20 and a making portion 21; and is a processing section to perform an analyzing and editing process of the PDF file.

The analyzing portion 18, after received the direct print instruction from the receiving section 15, reads out the PDF file from the receiving buffer 16; analyzes the PDF file; and judges existence/inexistence of page setting.

In the present embodiment, the analyzing portion 18 searches the letter row "/MediaBox" and the letter row "/CropBox" in the PDF file, and compares numerical value in the respective numerical value box "[x1 y1 x2 y2]" and "[x3 y3 x4 y4]" that continue to these respective letter rows. Then, when respective numerical values are coincident that is contained in respective numerical value boxes, that is, four equations $x1=x3$, $y1=y3$, $x2=x4$ and $y2=y4$ are all met, the analyzing portion 18 judges that the page setting has not been performed in the host computer 11, that is, adjustment of the image size is necessary, and instructs the adjusting portion 19 to adjust the image data in order.

Further, when any of the respective equations stated above is not met, the analyzing portion 18 judges that the page setting has been performed in the host computer 11, that is, adjustment of the image size is unnecessary. Then the analyzing portion 18 performs size setting of print region, and instructs the making portion 21 to make the PDF file.

The adjusting portion 19 instructs the comparing and judging section 29 to compare the page size (designation medium size) of the PDF file that becomes print object with the size of paper that is paper fed, and judge them for performing the adjustment of the image size. Then, on the basis of the judgment result, with respect to the calculating portion 20 and the making portion 21, an instruction is performed.

The calculating portion 20 has a function of calculating magnification/reduction rate information for magnifying or reducing the image data that is contained in the PDF file.

The making portion 21 makes the image data that is contained in the PDF file, and has a function of generating print intermediate data. The making portion 21 stores the print intermediate data in the intermediate data buffer 22; and instructs the expanding section 23 to expand the print intermediate data.

Further, the making portion 21 extracts the image data-inside of region from the image data that is contained in the PDF file as an extracting section on the basis of the informed of print region size information from the adjusting portion 19, and generates print intermediate data. Furthermore, the making portion 21 magnifies/reduces the image data into magnification/reduction image data as a magnification/reduction generating section on the basis of the informed of magnification/reduction rate information from the calculating portion 20, and generates print intermediate data.

The intermediate data buffer 22 is a temporarily storing section in which the print intermediate data is temporarily stored that is made and generated by the editing section 17.

The expanding section 23 reads out the print intermediate data from the intermediate data buffer 22 on the basis of expansion instruction from the editing section 17, and performs the expansion to the print image data of the print intermediate data. Then, the expanding section 23 stores the print image data in the image data buffer 24; and instructs the engine controlling section 25 to start the print.

The image data buffer 24 is a temporarily storing section in which the print image data is temporarily stored that is expanded and generated by the expanding section 23.

The engine controlling section 25 has a function of communicating with the engine section 13, reads out the print image data from the image data buffer 24 in order to start the print through the engine section 13 on the basis of the print start instruction from the expanding section 23, and sends the print image data and the print instruction to the engine section 13.

Further, the engine controlling section 25 sends a size detection instruction in order to detect size of paper, i.e. fed-paper size that is accommodated in the paper feeding tray 14 to the engine section 13 on the basis of the size detection instruction from the second obtaining section 28 stated later. Then, when the fed-paper size information representing the fed-paper size is received from the engine section 13, the engine controlling section 25 informs the second obtaining section 28 of the fed-paper size information.

The paper list table 26 is a storing section in which the paper size information representing size of paper capable of being used in the printing process in the printer 10 has been set and stored previously.

FIG. 4 is an explanation diagram showing a structure of paper list table.

In the paper list table 26, as shown by FIG. 4, a paper size item is set up that corresponds to paper distinguishment number for distinguishing respective paper and is used for storing paper size information of the paper. In the paper size item, as shown by FIG. 4, widthwise size item and lengthwise size item are respectively set up, and paper widthwise size information and paper lengthwise size information that are contained in the paper size information are respectively stored in respective items. Moreover, the paper widthwise size information represents size of widthwise direction of the paper itself that is accommodated in the paper feeding tray 14; and paper lengthwise size information represents size of lengthwise direction of the paper itself. The numerical value unit of respective information that is stored in the paper size item is any of point in the present embodiment.

Further, in the paper list table 26, as shown by FIG. 4, a print region item is set up that corresponds to paper distinguishment number of respective paper and is used for storing print region size information representing size of print region of the paper. Here, the print region represents a region capable of printing through the printer 10.

The printer usually cannot print in region of several millimeters and even ten or more millimeters from end of paper. Therefore, respective printers set the region as margin region; and sets part region except the margin region of respective paper as print region, and then forms image on the print region. In the print region size item of the paper list table 26, in the printer 10, the print region size information is stored that represents size of print region that is set with respect to respective paper.

In the print region size item, as shown by FIG. 4, widthwise size item and lengthwise size item are respectively set up, and print region widthwise size information and print region lengthwise size information that are contained in the print region size information are respectively stored in respective items. Moreover, the print region widthwise size information represents size of widthwise direction of print region; and print region lengthwise size information represents size of lengthwise direction of print region. The numerical value unit of respective information that is stored in the print region size item is any of point in the present embodiment.

For example, in the paper list table 26 that is shown by FIG. 4, paper widthwise size information "595", paper lengthwise size information "420", print region widthwise size information "575" and print region lengthwise size information "400" that correspond to paper distinguishment number "0x00" are respectively stored. Further, paper widthwise size information "595", paper lengthwise size information "842", print region widthwise size information "575" and print region lengthwise size information "822" that correspond to paper distinguishment number "0x01" are respectively stored.

Moreover, in the paper list table 26, respective size information that has been set and corresponds to paper distinguishment number "0x00" corresponds to paper of A5 size; and respective size information that has been set and corresponds to paper distinguishment number "0x01" corresponds to paper of A4 size.

The first obtaining section 27, when reading out the PDF file (FIG. 2) from the receiving buffer 16, searches the letter row "/MediaBox" that is contained in the PDF file. Then, the first obtaining section 27 obtains four numerical values that are contained in the numerical value box "[x1 y1 x2 y2]" that is recorded and continue to the letter row, as respective page information "x1", "y1", "x2" and "y2". Next, the first obtaining section 27 calculates and obtains page widthwise size information "x" and page lengthwise size information "y" on the basis of the respective page information that were obtained and the calculation formula $x=x2-x1$ and $y=y2-y1$.

For example, in the case of the PDF file that is shown by FIG. 2, the first obtaining section 27 detects and obtains page information x1=0.0, y1=0.0, x2=595.44 and y2=841.68. Then, the first obtaining section 27 calculates and obtains page size information that is composed of page widthwise size-information x=595.44 and page lengthwise size information y=841.68 on the basis of these.

The first obtaining section 27, after obtaining the page size information, refers to the paper list table 26 (FIG. 4), and compares the respective paper size information that has been stored with the page size information that was obtained. Then, the first obtaining section 27 selects paper size information that agrees with page size information, and informs the comparing and judging section 29 of the paper distinguishment number corresponding to the paper size information. Further, when the agreeing paper size information has not been set, the first obtaining section 27 informs the comparing and judging section 29 of "corresponding number inexistence" as paper distinguishment number.

The second obtaining section 28 sends a size detection instruction to the engine controlling section 25 in order to detect size of paper that has been accommodated in the paper feeding tray 14 as a fed-paper size. Then, after the fed-paper size information representing fed-paper size is received from the engine controlling section 25, the second obtaining section 28 refers to the paper list table 26 (FIG. 4), selects paper size information that agrees with the fed-paper size information, and obtains the corresponding paper distinguishment number. The second obtaining section 28 informs the comparing and judging section 29 of the obtained paper distinguishment number. Further, when the agreeing paper size information has not been set, the second obtaining section 28 obtains a default number that was set previously as paper distinguishment number, and informs the comparing and judging section 29 of it. In the present embodiment, the paper distinguishment number "0x01" has been set as the default number.

Furthermore, the second obtaining section 28 obtains print region size information corresponding to a specified paper distinguishment number from the paper list table 26, and informs the editing section 17 of the print region size information.

The comparing and judging section 29 compares the page size information corresponding to the PDF file that becomes the print object with the fed-paper size information corresponding to paper feeding tray 14, and has a function of judging whether or not these are coincident.

The comparing and judging section 29, after received the comparison and judgment instruction from the editing section 17, sends an obtaining instruction to the first obtaining section 27 and the second obtaining section 28. Then, the comparing and judging section 29 compares the informed of paper distinguishment number from the first obtaining section 27 with the informed of paper distinguishment number from the second obtaining section 28; according to whether or not the two paper distinguishment numbers are coincident, judges whether or not the page size agrees with the fed-paper size and informs the editing section 17 of the judgment result.

Next, it is to explain operation of the printer 10 of the present embodiment.

Figure 5:
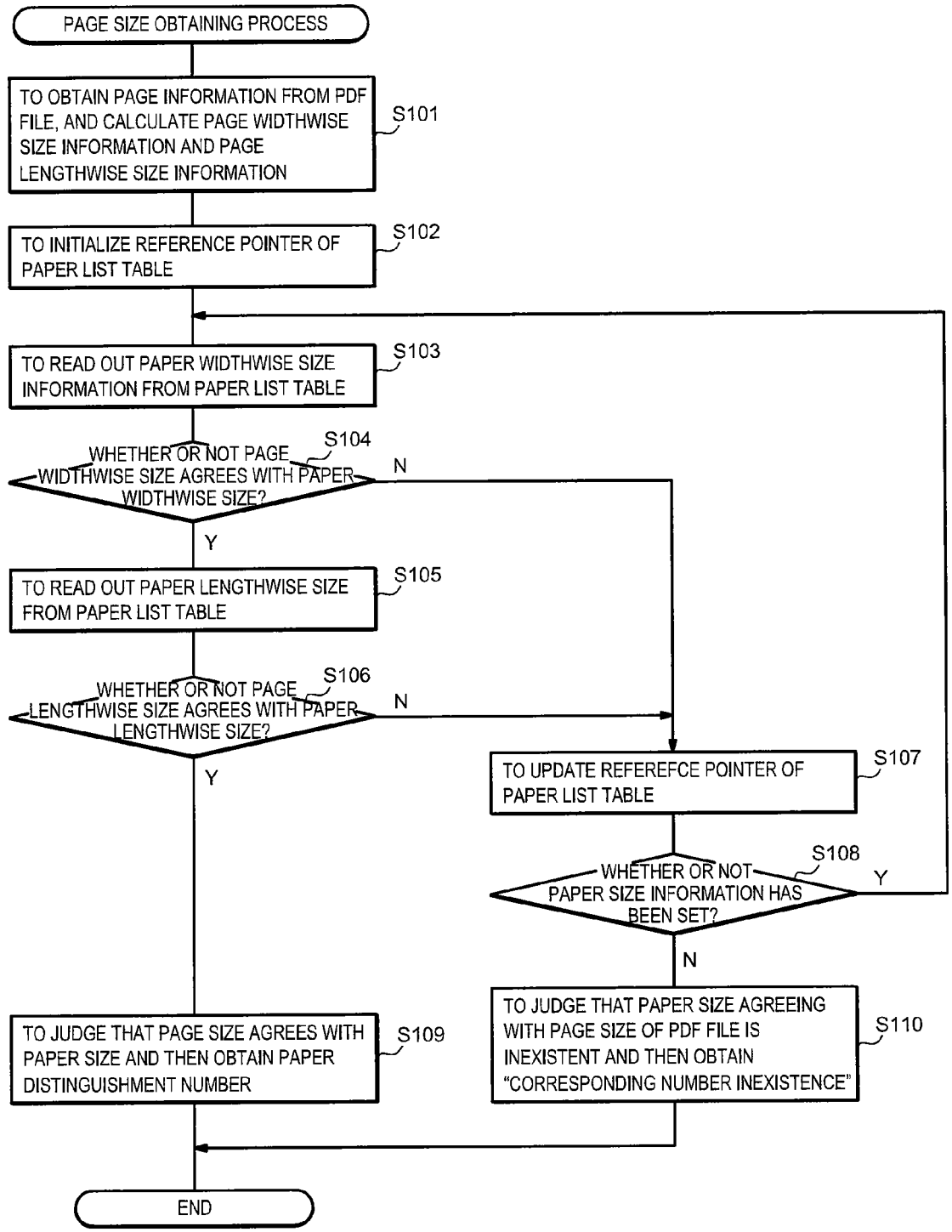
FIG. 5 is a flow chart for explaining a page size obtaining operation of controller unit of the present invention.

Firstly, it is to perform an explanation about a flow of a page size obtaining process on which the first obtaining section 27 detects page size of image data, and obtains a corresponding paper distinguishment number in the controller unit 12 of the printer 10 by using FIG. 5.

FIG. 5 is a flow chart for explaining a page size obtaining operation of controller unit of the present invention.

Here, it is to explain an example in the case that the page size of the PDF file (FIG. 2) agrees with the paper size that has been set to correspond to the paper distinguishment number "0x01" in the paper list table 26 (FIG. 4).

In the controller unit 12, when the comparing and judging section 29 sends the obtaining instruction to the first obtaining section 27 in order to obtain page size information of image data from the PDF file (FIG. 2), the first obtaining section 27 reads out the PDF file (FIG. 2) that has been stored in the receiving buffer 16. Then, the first obtaining section 27 detects the numerical value box "[0.0 0.0 595.44 841.68]"

that continues to the letter row "/MediaBox" from the PDF file. Then, the first obtaining section 27 respectively obtains respective numerical values x1=0.0, y1=0.0, x2=595.44 and y2=841.68 as page information from the numerical value box (Step S101). Furthermore, the first obtaining section 27 respectively calculates the page widthwise size information x=x2−x1=595.44 and the page lengthwise size information y=y2−y1=841.68 as page size information on the basis of the obtained page information (Step S101).

Next, the first obtaining section 27, firstly, initializes reference pointer of the paper list table 26 in order to refer to the paper list table 26 (Step S102). In the paper list table 26 that is shown by FIG. 4, the reference pointer is initialized at the position of the paper distinguishment number "0x01" (Step S102).

Continuously, the first obtaining section 27 refers to the paper list table 26, and reads out paper widthwise size information from widthwise size item of paper size item corresponding to reference pointer (Step S103). The first obtaining section 27 reads out paper widthwise size information "595" from widthwise size item of paper size item corresponding to paper distinguishment number "0x00" (Step S103).

Then, the first obtaining section 27 compares the obtained page widthwise size information with the read out paper widthwise size information, and judges whether or not widthwise size of respective pages of the PDF file agrees with widthwise size of paper that has been set in the paper list table 26 (Step S104). In the present embodiment, the first obtaining section 27, when difference between page widthwise size information and paper widthwise size information is within ±5 points, judges whether or not widthwise size of page agrees with widthwise size of paper. Here, because the page widthwise size information is 595.44, and the paper widthwise size information is 595, so these difference is within ±5 points. Therefore, the first obtaining section 27 judges that the page widthwise size agrees with the paper widthwise size (Step S104).

Next, the first obtaining section 27 refers to the paper list table 26, and reads out paper lengthwise size information from lengthwise size item of paper size item corresponding to reference pointer (Step S105). The first obtaining section 27 reads out paper lengthwise size information "420" from lengthwise size item of paper size item corresponding to the paper distinguishment number "0x00" (Step S105).

Then, the first obtaining section 27 compares the obtained page lengthwise size information with the read out paper lengthwise size information, and judges whether or not whether or not page lengthwise size agrees with paper lengthwise size (Step S106). In the present embodiment, the first obtaining section 27, when difference between page lengthwise size information and paper lengthwise size information is within ±5 points, judges whether or not page lengthwise size agrees with paper lengthwise size. Here, because the page lengthwise size information is 841.68, and the paper lengthwise size information is 420, so these difference is bigger than ±5 points. Therefore, the first obtaining section 27 judges that the page lengthwise size does not agree with the paper lengthwise size (Step S106).

As stated above, when it is judged that the page lengthwise size does not agree with the paper lengthwise size (Step S106), or, in the Step S104, when it is judged that the page widthwise size does not agree with the paper widthwise size, the first obtaining section 27 updates reference pointer of the paper list table 26 (Step S107). In the paper list table 26 shown by FIG. 4, the reference pointer is updated from the position of the paper distinguishment number "0x00" to the position of the paper distinguishment number "0x01" (Step S107).

Continuously, the first obtaining section 27 judges whether or not the paper size information corresponding to the updated reference pointer has been set in the paper list table (FIG. 4) (Step S108). In the paper list table (FIG. 4), because the paper size information corresponding to the paper distinguishment number "0x01" has been set, the first obtaining section 27 judges that the paper size information corresponding to the updated reference pointer has been set (Step S108).

Continuously, the first obtaining section 27 reads out the paper widthwise size information "595" from the widthwise size item of the paper size item corresponding to the paper distinguishment number "0x01" (Step S103), compares the obtained page widthwise size information "595.44" with the read out paper widthwise size information "595", and judges they are coincident (Step S104).

Furthermore, the first obtaining section 27 refers to the paper list table 26, and reads out paper lengthwise size information "842" from lengthwise size item of paper size item corresponding to reference pointer (Step S105), compares the obtained page lengthwise size information "841.68" with the read out paper lengthwise size information "842", and judges that they are coincident (Step S106).

Then, when it is judged that the page lengthwise size agrees with the paper lengthwise size (Step S106), the first obtaining section 27 judges that the page size agrees with the paper size, obtains the paper distinguishment number "0x01" on the basis of the reference pointer of the paper list table 26, and informs the comparing and judging section 29 of it (Step S109). Thus, the page size obtaining process is completed in the controller unit 12.

As stated above, the page size information of image data is detected that is contained in the PDF file, and the corresponding paper distinguishment number is obtained.

Moreover, in the Step S108, when it is judged that the paper size information corresponding to the updated reference pointer has been set, the first obtaining section 27 judges that the paper agreeing with the page size of the PDF file has not been set in the paper list table 26, obtains the "corresponding number inexistence" as the paper distinguishment number, and informs the comparing and judging section 29 of it (Step S110).

Figure 6:
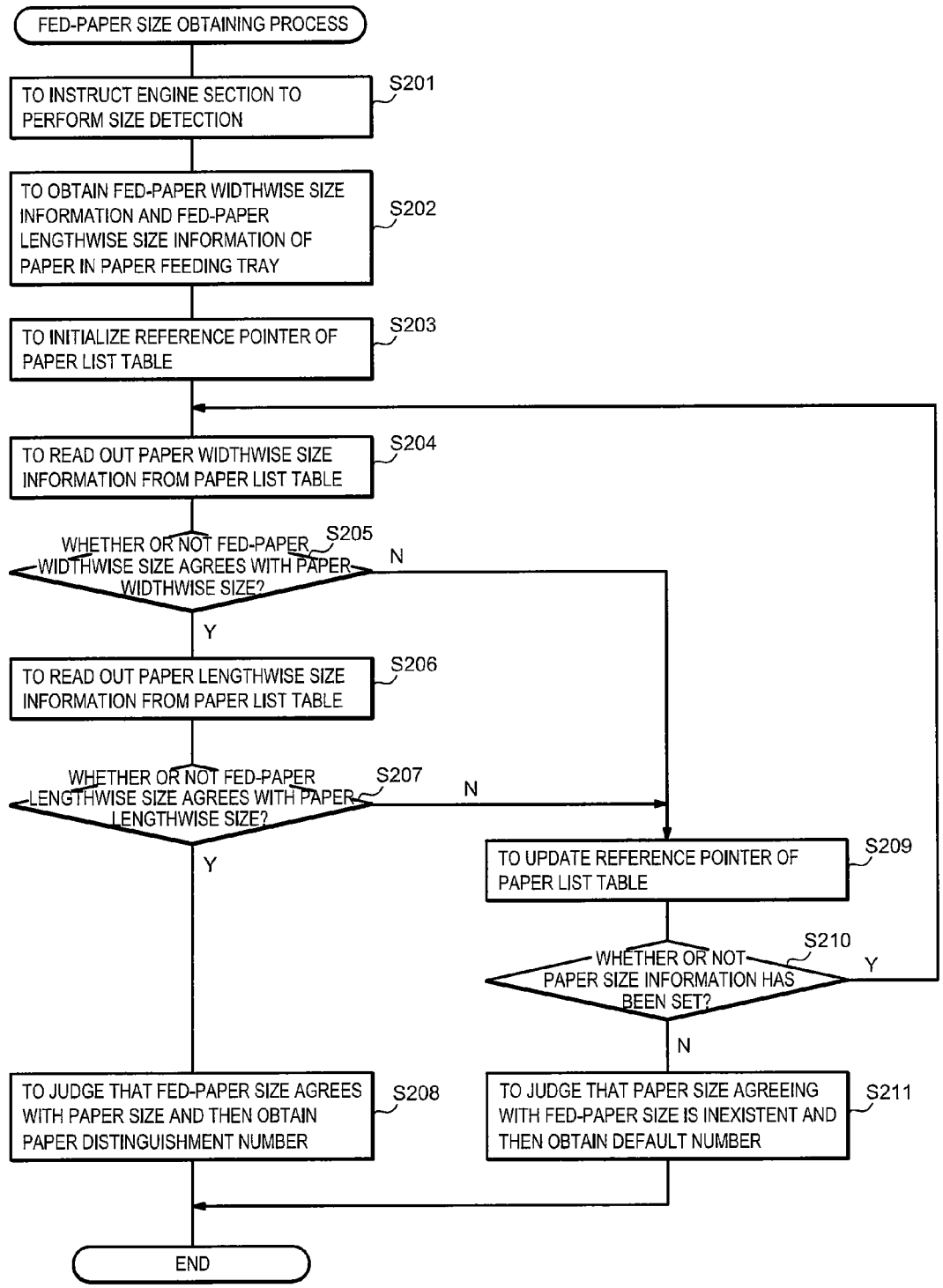
FIG. 6 is a flow chart for explaining a fed-paper size obtaining operation of controller unit of the present invention.

Next, it is to perform an explanation about a flow of a fed-paper size obtaining process on which the second obtaining section 28 detects fed-paper size corresponding to the paper feeding tray 14, and obtains a corresponding paper distinguishment number in the controller unit 12 of the printer 10 by using FIG. 6.

FIG. 6 is a flow chart for explaining a fed-paper size obtaining operation of controller unit of the present invention.

In the controller unit 12, after the comparing and judging section 29 sends the obtaining instruction to the second obtaining section 28 in order to obtain size of paper, that is, fed-paper size information representing fed-paper size in the paper feeding tray 14 that has been installed in the engine section 13, the second obtaining section 28 sends a size detection instruction to the engine section 13 through the engine controlling section 25 (Step S201).

The engine section 13, after received the size detection instruction, detects fed-paper widthwise size information that represents widthwise size of paper that has been accommodated in the paper feeding tray 14 and fed-paper size information that is formed from fed-paper lengthwise size information representing lengthwise size, and informs the engine controlling section 25 of the fed-paper size information (Step S202). Then, the engine controlling section 25 informs the second obtaining section 28 of the informed of fed-paper size information (Step S202).

Next, the second obtaining section 28, firstly, initializes the reference pointer of the paper list table 26 (FIG. 4) in order to refer to the paper list table 26 (Step S203).

Continuously, the second obtaining section 28 refers to the paper list table 26, and reads out the paper widthwise size information from widthwise size item of paper size item corresponding to the reference pointer (Step S204).

Then, the second obtaining section 28 compares the obtained fed-paper widthwise size information with the read out paper widthwise size information, and judges whether or not the widthwise size of paper in the paper feeding tray 14 agrees with the widthwise size of paper that has been set in the paper list table 26 (Step S205). In the present embodiment, the second obtaining section 28, when difference between the fed-paper widthwise size information and the paper widthwise size information is within ±5 points, judges that the fed-paper widthwise size agrees with the paper widthwise size.

When it is judged that they are coincident, the second obtaining section 28, furthermore, refers to the paper list table 26, and reads out paper lengthwise size information from lengthwise size item of paper size item corresponding to the reference pointer (Step S206).

Then, the second obtaining section 28 compares the obtained fed-paper lengthwise size information with the read out paper lengthwise size information, and judges whether or not the fed-paper lengthwise size agrees with the paper lengthwise size (Step S207). In the present embodiment, the second obtaining section 28, when the difference between the fed-paper lengthwise size information and the paper lengthwise size information is within ±5 points, judges that the fed-paper lengthwise size agrees with the paper lengthwise size.

When it is judged that they are coincident, the second obtaining section 28 judges that the fed-paper size agrees with the paper size, obtains paper distinguishment number on the basis of the reference pointer of the paper list table 26, and informs the comparing and judging section 29 of it (Step S208). Thus, the fed-paper size obtaining process is completed in the controller unit 12.

As stated above, the fed-paper size of the paper feeding tray 14 is detected, and the corresponding paper distinguishment number is obtained.

Moreover, in the Step S205, when it is judged that the fed-paper widthwise size does not agree with the paper widthwise size, or, in the Step S207, when it is judged that the fed-paper lengthwise size does not agree with the paper lengthwise size, the second obtaining section 28 updates reference pointer of the paper list table 26 (Step S209). Then, when it is judged that paper size information has been set that corresponds to the updated reference pointer (Step S210), the second obtaining section 28 performs comparing and judging process between the paper size information and the fed-paper size information has been set (Step S204~Step S207).

When it is judged that the corresponding paper size information has not been set (Step S210), the second obtaining section 28 judges that the paper size information agreeing with size of paper in the paper feeding tray 14 has not been set in the paper list table 26 (Step S211). At this time, the second obtaining section 28 obtains a default number "0x01" as paper distinguishment number (Step S211), and informs the comparing and judging section 29 of the default number.

Figure 7:
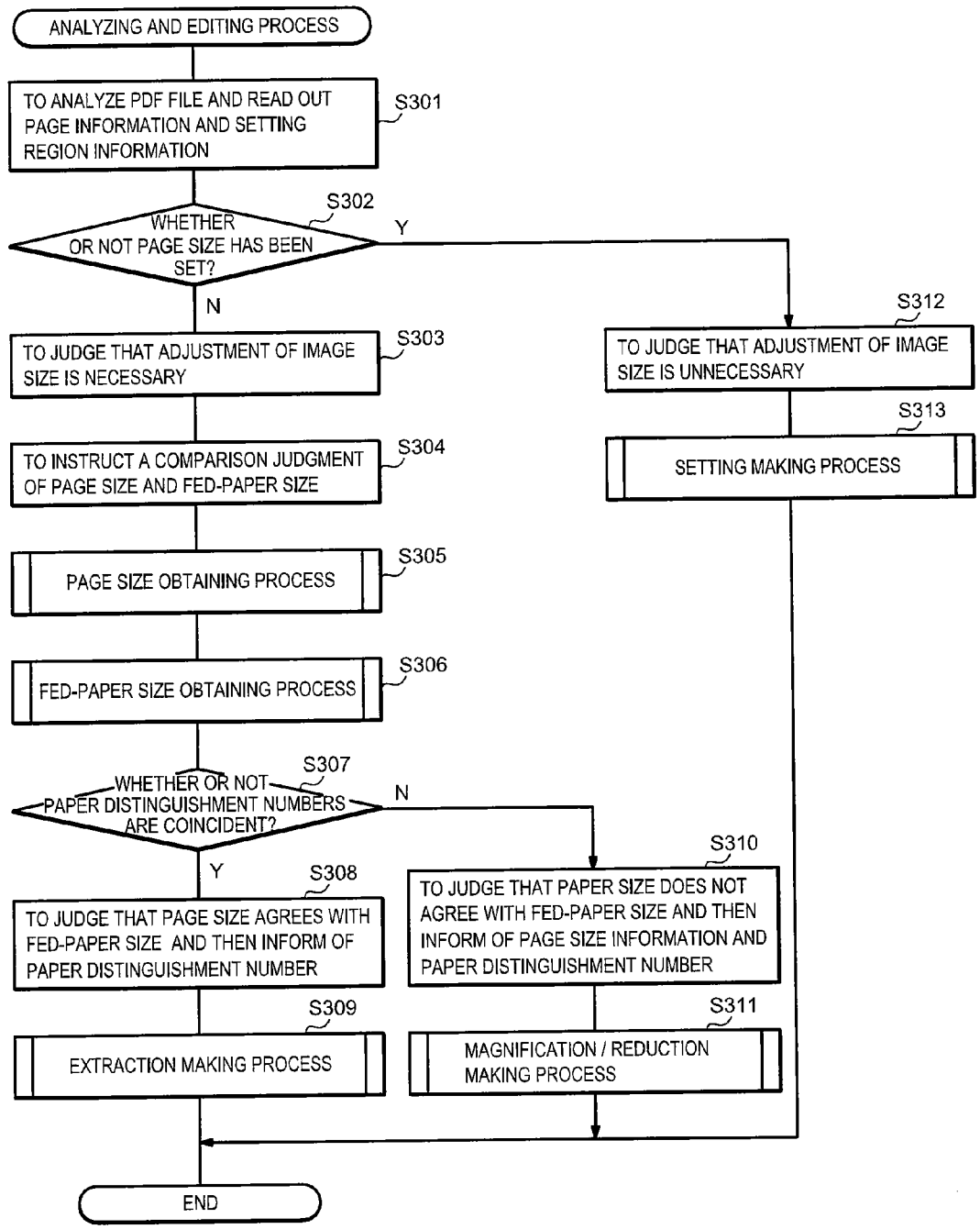
FIG. 7 is a flow chart for explaining an analyzing and editing operation in embodiment 1 of controller unit of the present invention.

Next, it is to explain a flow of an analyzing and editing process of receiving data in the controller unit 12 of the printer 10 by using FIG. 7.

FIG. 7 is a flow chart for explaining an analyzing and editing operation in embodiment 1 of controller unit of the present invention.

Before the analyzing and editing process is performed, the direct print instruction and the PDF file are sent from the host computer 11 to the printer 10, and are received by the receiving section 15. Here, firstly, it is to perform an explanation about a flow of process in the case that page size has not been set in the host computer 11, and an example in the case that the page size of the PDF file (FIG. 2) agrees with the fed-paper size.

In the controller unit 12, after the editing section 17 received the direct print instruction from the receiving section 15, the analyzing portion 18 performs an analysis of the PDF file (FIG. 2) (Step S301). The analyzing portion 18 reads out the PDF file from the receiving buffer 16, searches the letter row "/CropBox", and reads out setting region information $x3=0.0$, $y3=0.0$, $x4=595.44$ and $y4=841.68$ from the numerical value box continuing to the letter row (Step S301).

Further, the analyzing portion 18 searches the letter row "/MediaBox", and reads out page information $x1=0.0$, $y1=0.0$, $x2=595.44$ and $y2=841.68$ from the numerical value box continuing to the letter row (Step S301).

Then, the analyzing portion 18 compares the setting region information with the page information in order to judge existence/inexistence of setting of page size. The analyzing portion 18, when four equations $x1=x3$, $y1=y3$, $x2=x4$ and $y2=y4$ are all met, judges that the page size has not been set (Step S302).

On the basis of this judgment, the analyzing portion 18 judges that adjustment of image size is performed, and sends the size adjustment instruction to the adjusting portion 19 (Step S303).

The adjusting portion 19, after instructed the size adjustment, sends comparison and judgment instruction to the comparing and judging section 29 in order to compare page size of the PDF file that becomes the print object with fed-paper size of the paper feeding tray 14 (Step S304).

The comparing and judging section 29, after received the comparison and judgment instruction from the editing section 17, sends an obtaining instruction to the first obtaining section 27 in order to obtain page size information of the PDF file and corresponding paper distinguishment number. Then, the first obtaining section 27 performs the page size obtaining process (FIG. 5) (Step S305). The first obtaining section 27, after obtaining the page size information from the PDF file shown by FIG. 2, obtains paper distinguishment number "0x01" from the paper list table 26, and informs the comparing and judging section 29 of the paper distinguishment number (Step S305).

Next, the comparing and judging section 29 sends the obtaining instruction to the second obtaining section 28 in order to obtain fed-paper size information corresponding to paper in the paper feeding tray 14 and corresponding paper distinguishment number. Then, the second obtaining section 28 performs the fed-paper size obtaining process (FIG. 6) (Step S306). The second obtaining section 28, after obtaining the fed-paper size information, obtains the paper distinguishment number "0x01" from the paper list table 26, and informs the comparing and judging section 29 of the paper distinguishment number (Step S306).

Then, the comparing and judging section 29 compares the informed of paper distinguishment number from the first obtaining section 27 with the informed of paper distinguishment number from the second obtaining section 28, and judges whether or not they are coincident (Step S307). When it is judged that they are coincident (Step S307), the comparing and judging section 29 judges that the page size of image data that is contained in the PDF file agrees with the size of paper in the paper feeding tray 14, and informs the editing section 17 of the judgment result and the agreeing paper distinguishment number "0x01" (Step S308).

Continuously, the adjusting portion 19 and the making portion 21 of the editing section 17 performs extraction making process of the PDF file on the basis of the informed of paper distinguishment number, generates print intermediate data, and stores the print intermediate data in the intermediate data buffer 22 (Step S309). Thus, the analyzing and editing process is completed in the controller unit 12. The detailed flow of the extraction making process in the Step S309 is stated later.

In the Step S307, when it is judged that the paper distinguishment numbers are not agree, the comparing and judging section 29 judges that the page size does not agree with the fed-paper size, and informs the editing section 17 of the page size information that was obtained by the first obtaining section 27 and the paper distinguishment number that was obtained by the second obtaining section 28 (Step S310).

Continuously, the calculating portion 20 and the making portion 21 of the editing section 17 perform magnification/reduction making process, generates print intermediate data, and stores the print intermediate data in the intermediate data buffer 22 (Step S311). Thus, the analyzing and editing process is completed in the controller unit 12. The detailed flow of the magnification/reduction making process in the Step S311 is stated later.

As stated above, in the controller unit 12, on the basis of comparison and judgment result between the page size of the PDF file and fed-paper size, the editing process of the PDF file is performed, and the print intermediate data is generated.

Moreover, in the Step S302, when the page information does not agree with the setting region information, the analyzing portion 18 judges that the page size has been set. On the basis of the judgment, the analyzing portion 18 judges that the adjustment of the image size is unnecessary (Step S312); on the basis of the page information and setting region information that were read out, the making portion 21 performs setting making process, generates print intermediate data, and stores the print intermediate data in the intermediate data buffer 22 (Step S313). The flow of the setting making process is stated later.

Figure 8:
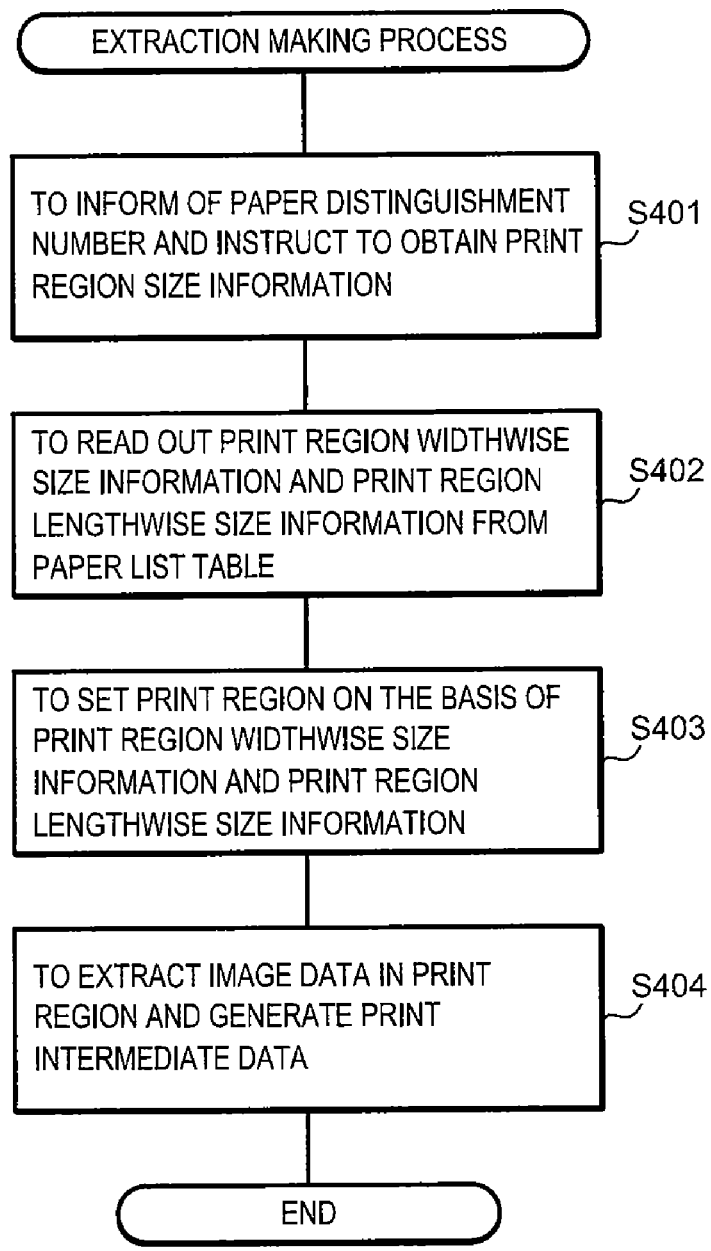
FIG. 8 is a flow chart for explaining an extraction making operation in embodiment 1 of controller unit of the present invention.

Next, it is to perform an explanation about the extraction making process from the image data to the print intermediate data that is performed in the editing section 17 of the controller unit 12 by using FIG. 8 and FIG. 9.

FIG. 8 is a flow chart for explaining an extraction making operation in embodiment 1 of controller unit of the present invention; and FIG. 9 is a diagram for explaining an extraction making process of image data in embodiment 1.

Moreover, the extraction making process corresponds to operation of the Step S309 in the FIG. 7.

In the comparing and judging section 29 of the controller unit 12, when it is judged that the page size of the PDF file agrees with the fed-paper size of the paper feeding tray 14, and the editing section 17 is informed of the paper distinguishment number "0x01" of paper corresponding to the size, the adjusting portion 19 informs the second obtaining section 28 of the paper distinguishment number, and instructs to obtain the print region size information (Step S401).

The second obtaining section 28 refers to the paper list table 26 (FIG. 4), and reads out print region widthwise size information "575" from widthwise size item of print region size item corresponding to the informed of paper distinguishment number "0x01" (Step S402). Further, the second obtaining section 28 reads out print region lengthwise size information "822" from corresponding lengthwise size item (Step S402). Then, the second obtaining section 28 informs the adjusting portion 19 of the print region widthwise size information "575" and the print region lengthwise size information "822".

The adjusting portion 19 performs a setting of print region on the basis of the print region widthwise size information "575" and the print region lengthwise size information "822" that were informed (Step S403). Next, it is to perform an explanation about setting of print region by using FIG. 9A.

Figures 9A, 9B:
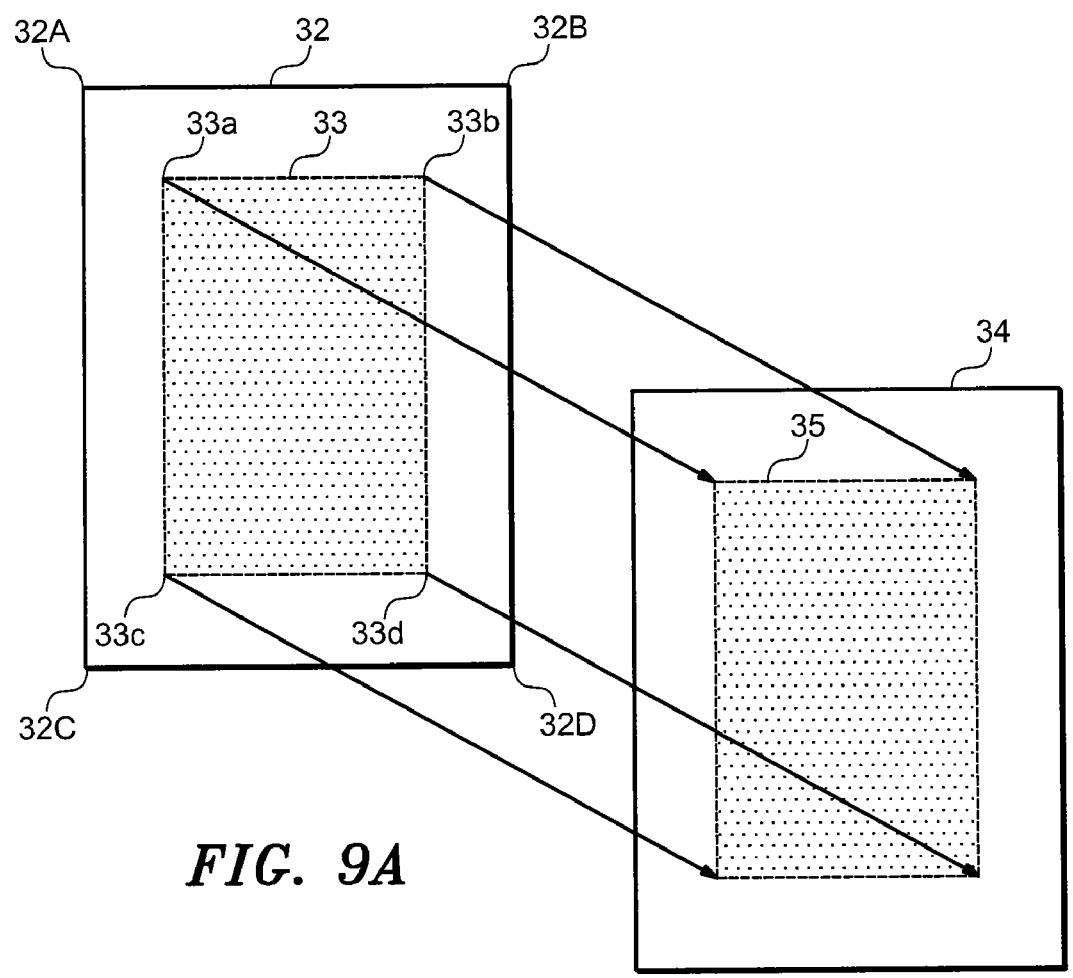
FIG. 9 is a diagram for explaining an extraction making process of image data in embodiment 1.

FIG. 9A is a diagram showing a page image based on image data that is contained in the PDF file.

A page image 32 is formed from a rectangular region having four top points "32A", "32B", "32C" and "32D"; and the region size of the rectangular region corresponds to the page size that was obtained through the first obtaining section 27. That is, the page widthwise size information represents the length between the top point "32A" and the top point "32B"; and the page lengthwise size information represents the length between the top point "32A" and the top point "32C".

The adjusting portion 19 sets a print region 33 with respect to the page image 32. Here, the print region 33 is formed from a rectangular region having top points "33a", "33b", "33c" and "33d"; and the region size of the rectangular region is set on the basis of the print region size information that was obtained through the second obtaining section 28. That is, the adjusting portion 19 sets the length between the top point "33a" and the top point "33b" on the basis of the print region widthwise size information, and sets the length between the top point "33a" and the top point "33c" on the basis of the print region lengthwise size information. In the present embodiment, the adjusting portion 19 performs the setting on which print region is arranged on the center part in the page image 30.

Then, the making portion 21 extracts image data in print region corresponding to the set print region, generates print intermediate data, and stores it in the intermediate data buffer 22 (Step S404). Thus, the extraction making process is completed in the controller unit 12.

As stated above, the image data is extracted that corresponds to the print region from the image data of the PDF file, and the print intermediate data is generated.

FIG. 9B is a diagram showing a page image based on print intermediate data after the extraction making process.

In the FIG. 9B, a rectangular region 34 has a region size corresponding to the fed-paper size; and a rectangular region 35 has a region size corresponding to the print region 33.

The image data in the region that was extracted from the print region 33 of the page image 32 that is shown by FIG. 9A, as shown by FIG. 9B, is made by the same size, and generates print intermediate data.

Figure 10:
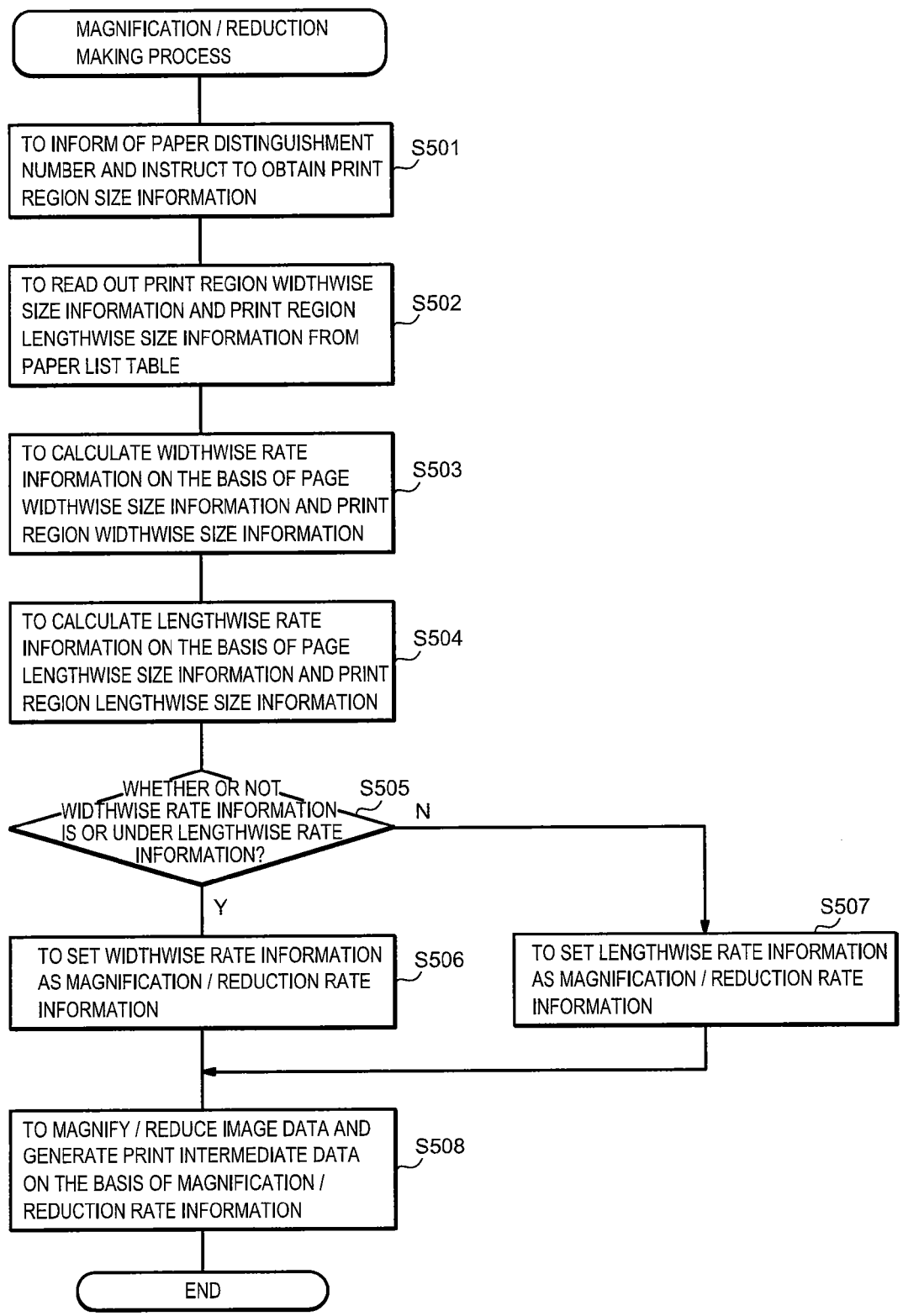
FIG. 10 is a flow chart for explaining a magnification/reduction making operation in embodiment 1 of controller unit of the present invention.

Next, it is to perform an explanation about magnification/reduction making process from image data to print intermediate data that is performed in the editing section 17 of the controller unit 12 by using FIG. 10 and FIG. 11.

FIG. 10 is a flow chart for explaining a magnification/reduction making operation in embodiment 1 of controller unit of the present invention; and FIG. 11 is a diagram for explaining a magnification/reduction making process of image data in embodiment 1.

Moreover, the magnification/reduction making process corresponds to operation of Step S311 in the FIG. 7.

Before the magnification/reduction making process is performed, when it is judged that the page size of the PDF file does not agree with the fed-paper size of the paper feeding tray 14, the editing section 17 is informed of the page size information that was obtained by the first obtaining section 27 and the paper distinguishment number corresponding to the fed-paper size that was obtained by the second obtaining section 28. The page size information that is informed by the second obtaining section 28 is regarded as page widthwise size information "x1" and page lengthwise size information "y1".

Figures 11A, 11B:
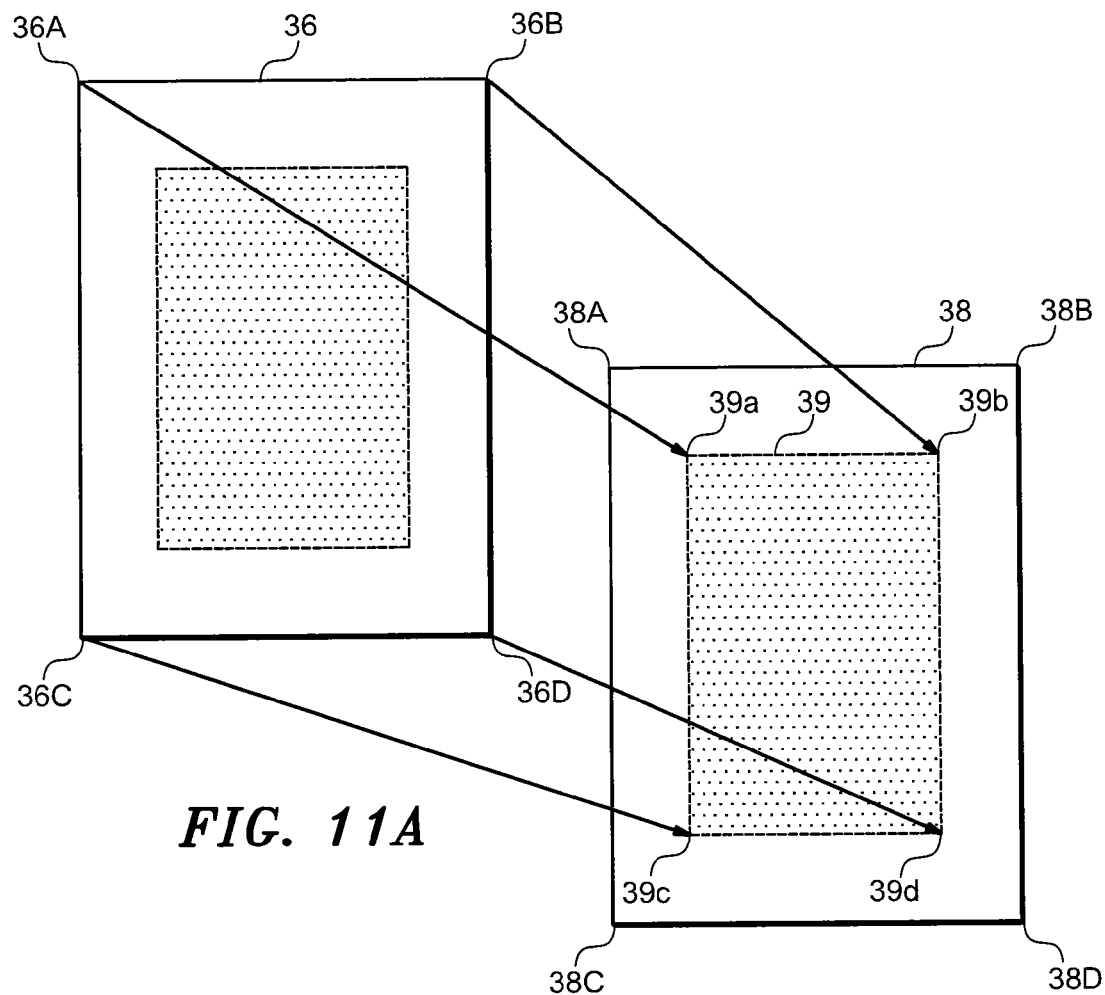
FIG. 11 is a diagram for explaining a magnification/reduction making process of image data in embodiment 1.

FIG. 11A is a diagram showing a page image based on image data that is contained in the PDF file.

A page image 36 is formed from a rectangular region having top points "36A", "36B", "36C" and "36D"; and the region size of the rectangular region corresponds to the page size that was obtained through the first obtaining section 27. That is, the page widthwise size information "x1" represents the length between the top point "36A" and the top point "36B"; and the page lengthwise size information "y1" represents the length between the top point "36A" and the top point "36C".

After the editing section 17 is informed of the page size information and the paper distinguishment number, the calculating portion 20 informs the second obtaining section 28 of the informed of paper distinguishment number, and instructs to obtain the print region size information (Step S501).

The second obtaining section 28 refers to the paper list table 26 (FIG. 4), reads out print region widthwise size information "x2" from widthwise size item of print region size item corresponding to the informed of paper distinguishment number, and reads out print region lengthwise size information "y2" from corresponding lengthwise size item (Step S502). Then, the second obtaining section 28 informs the calculating portion 20 of the print region widthwise size information "x2" and the print region lengthwise size information "y2".

FIG. 11B is a diagram showing a page image based on print intermediate data after the extraction making process.

In the FIG. 11B, a rectangular region 38 having top points "38A", "38B", "38C" and "38D" corresponds to the fed-paper size. Then, a rectangular region 38 having top points "39a", "39b", "39c" and "39d" shows a print region 39 that has print region size. That is, the print region widthwise size information "x2" that was obtained by the second obtaining section 28 becomes the length between the top point "39a" and the top point "39b"; and the print region lengthwise size information "y2" becomes the length between the top point "39a" and the top point "39c".

The editing section 17 performs magnification/reduction of image size so that the page image 36 shown by FIG. 11A is accommodated in the print region 39 shown by FIG. 11B.

The calculating portion 20 calculates $Rx=x2/x1$ as widthwise rate information "Rx" on the basis of the informed of page widthwise size information "x1" from the first obtaining section 27 and the informed of print region widthwise size information "x2" from the second obtaining section 28 (Step S503).

Further, the calculating portion 20 calculates $Ry=y2/y1$ as lengthwise rate information "Ry" on the basis of the informed of page lengthwise size information "y1" from the first obtaining section 27 and the informed of print region lengthwise size information "y2" from the second obtaining section 28 (Step S503).

Then, the calculating portion 20 compares the widthwise rate information "Rx" with the lengthwise rate information "Ry", and judges whether or not the widthwise rate information "Rx" is or under the lengthwise rate information "Ry" (Step S505).

When $Rx \leq Ry$ (Step S505), the calculating portion 20 sets the widthwise rate information "Rx" as magnification/reduction rate information "R" (Step S506). Further, When $Rx > Ry$ (Step S505), the calculating portion 20 sets the lengthwise rate information "Ry" as magnification/reduction rate information "R" (Step S507). The making portion 21 is informed of the magnification/reduction rate information "R" that was set.

The making portion 21, after informed of the magnification/reduction rate information "R" from the calculating portion 20, performs magnification/reduction process of image data that is contained in the PDF file, and generates print intermediate data (Step S508). The making portion 21 magnifies/reduces the page image 36 (FIG. 11A) "R" times, generates print intermediate data of size that is accommodated in the print region 39 (FIG. 11B), and stores it in the intermediate data buffer 22 (Step S508). Thus, the magnification/reduction making process is completed in the controller unit 12.

As stated above, the image data of the PDF file is magnified/reduced that corresponds to the print region; and the print intermediate data is generated.

Figure 12:
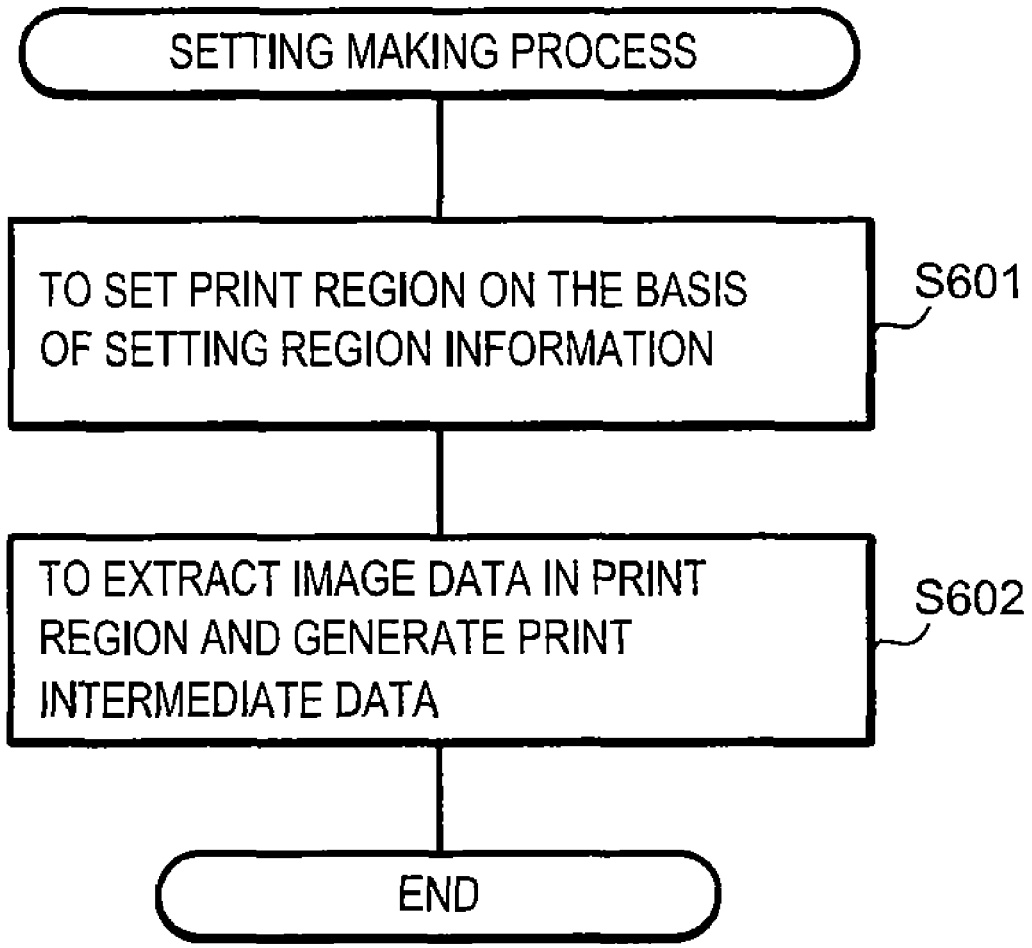
FIG. 12 is a flow chart for explaining a setting making operation of controller unit of the present invention.

Next, it is to perform an explanation about setting making process that is performed in the editing section 17 of the controller unit 12 by using FIG. 12.

FIG. 12 is a flow chart for explaining a setting making operation of controller unit of the present invention.

Moreover, the setting making process corresponds to operation of the Step S313 in the FIG. 7, and is process on which the page size makes the image data of setting end into the print intermediate data in the host computer 11.

In the editing section 17 of the controller unit 12, when it is judged that the adjustment of the image size is unnecessary, the analyzing portion 18 sets the print region on the basis of the setting region information "x3", "y3", "x4" and "y4" that was read out from the PDF file (Step S601).

Then, the making portion 21 extracts the image data in the print region from the image data of the PDF file, and generates print intermediate data (Step S602).

As stated above, on the basis of the print region that was set in the host computer 11, the PDF file is made; and the print intermediate data is generated.

Finally, it is to explain a flow of a direct print process in the printer 10 of the present embodiment.

Figure 13:
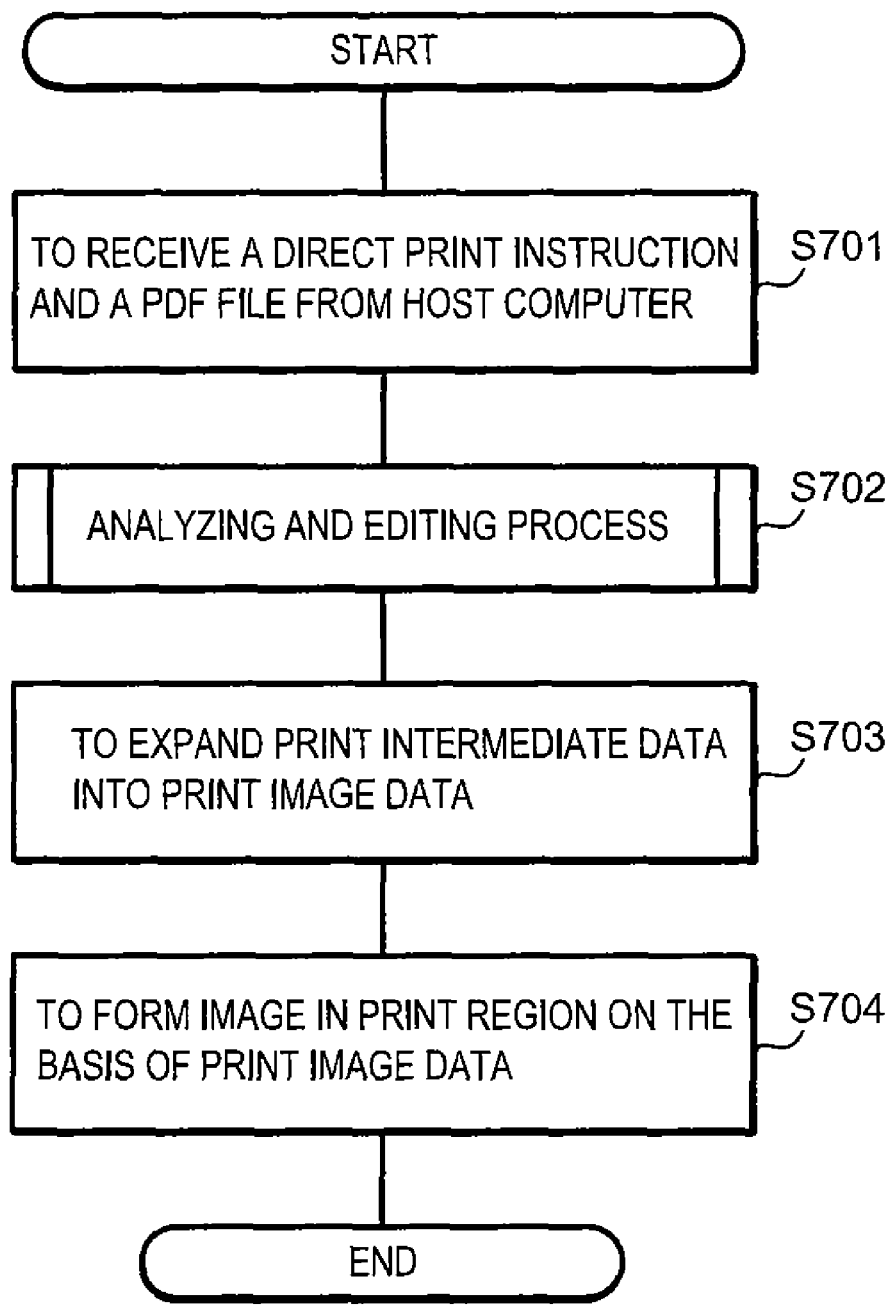
FIG. 13 is a flow chart for explaining a direct print operation in embodiment 1 of printer comprising a controller unit of the present invention.

FIG. 13 is a flow chart for explaining a direct print operation in embodiment 1 of printer comprising a controller unit of the present invention.

In the printer 10, after the receiving section 15 of the controller unit 12 receives the direct print instruction and the PDF file from the host computer 11 (Step S701), the receiving section 15 stores the PDF file in the receiving buffer 16, and sends the direct print instruction to the editing section 17.

Then, in the controller unit 12, the analyzing and editing process (FIG. 7) of the PDF file is performed (Step S702). After the editing section 17 analyzes the PDF file, sets the print region, and generates the print intermediate data, it stores the print intermediate data in the intermediate data buffer 22; and sends the expansion instruction of the print intermediate data to the expanding section 23 (Step S702).

The expanding section 23 reads out and expands the print intermediate data from the intermediate data buffer 22 on the basis of the expansion instruction from the editing section 17, and generates print image data (Step S703). Then, the expanding section 23 stores the print image data in the image data buffer 24; and instructs the engine controlling section 25 to start the print.

The engine controlling section 25, after received the print start instruction, reads out the print image data from the image data buffer 24, and sends the print instruction and the print image data to the engine section 13. Then, the engine section 13 forms image in the print region of paper that was paper fed from the paper feeding tray 14 on the basis of the print image data, and performs the print (Step S704). Thus, the print process is completed in the printer 10.

As stated above, the direct print process based on the PDF file is performed in the printer 10.

As stated above, according to the printer 10 on which the controller unit 12 of the present embodiment is installed, when the page size of the PDF file agrees with size of paper in the paper feeding tray 14, the data corresponding to the print region of the paper extracts from the PDF file, and the print image data of the print region size is made. Therefore, because unnecessary image reduction is prevented, and it is possible to print the PDF file in a desirable size, so the convenience is improved.

<Embodiment 2>

Figure 14:
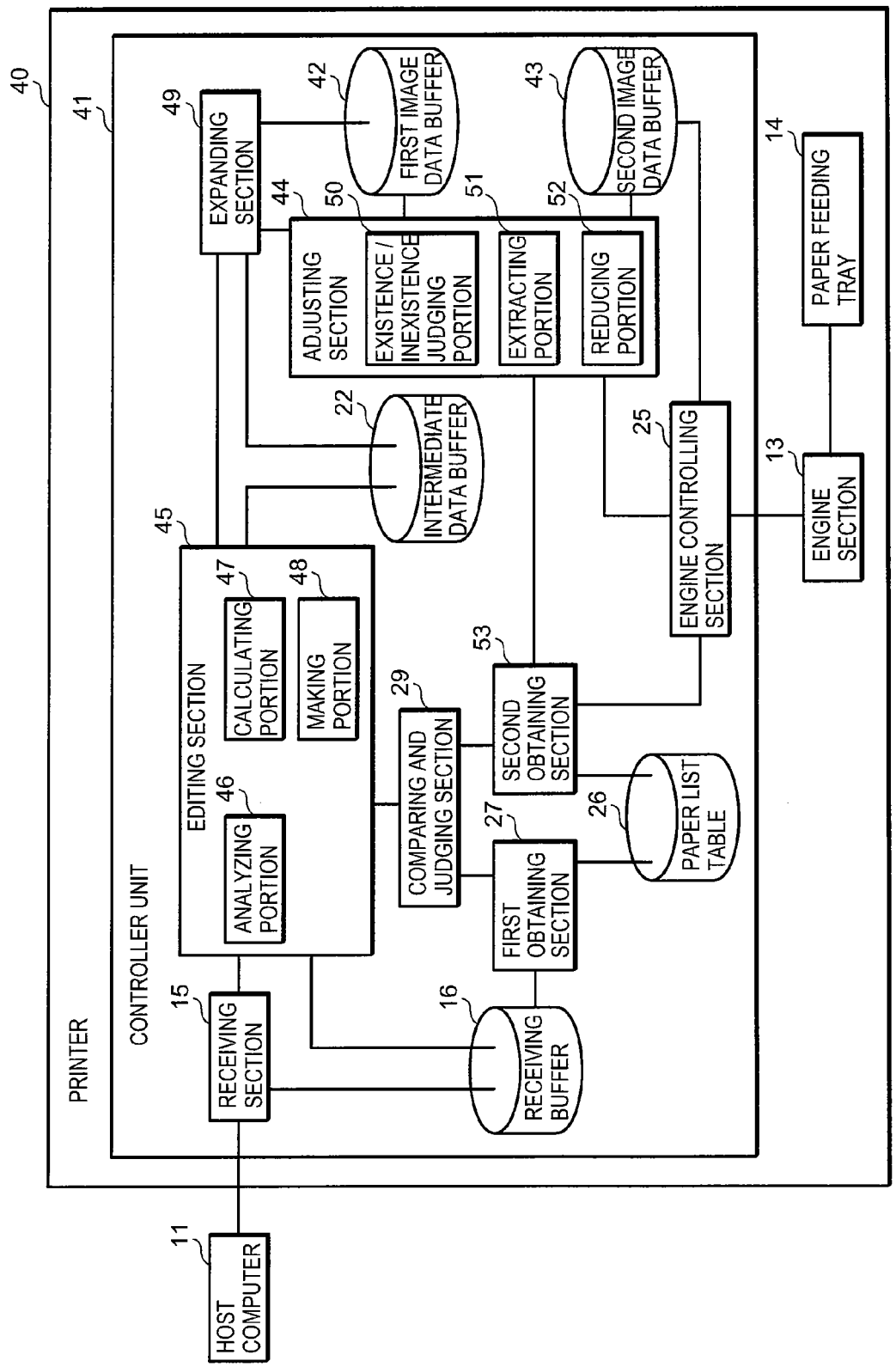
FIG. 14 is block diagram showing a structure of a printer comprising a controller unit of embodiment 2 of the present invention.

FIG. 14 is block diagram showing a structure of a printer comprising a controller unit of embodiment 2 of the present invention.

In the printer 40 of the present embodiment, a first image data buffer 42 and a second image data buffer 43 in a controller unit 41 are set up; and a structure on which an adjusting section 44 is added for performing a size adjustment of print image data is different from the structure of the embodiment 1.

Moreover, in the present embodiment, the same structure as the embodiment 1 is shown by the same mark, and the detailed explanations about these are omitted.

The printer 40, as a print apparatus on which a direct print function is installed, as shown by FIG. 14, is connected to the host computer 11 as an upper apparatus, and comprises a controller unit 41, an engine section 13 and a paper feeding tray 14.

The controller unit 41, as a print controlling apparatus of the present embodiment$ as shown by FIG. 14, comprises a receiving section 15, a receiving buffer 16, an editing section 45, an intermediate data buffer 22, a expanding section 49, a first image data buffer 42, a second image data buffer 43, an adjusting section 44, an engine controlling section 25, a paper list table 26, a first obtaining section 27, a second obtaining section 53 and a comparing and judging section 29.

The editing section 45, as shown by FIG. 14, has an analyzing portion 46, a calculating portion 47 and a making portion 48, and is a processing section that performs the analyzing and editing process of the PDF file.

The analyzing portion 46, after received the direct print instruction from the receiving section 15, reads out the PDF file from the receiving buffer 16, analyzes the PDF file, and judges existence/inexistence of page setting.

When it is judged that the page setting has not been performed, the analyzing portion 46 judges that the adjustment of the image size is necessary, and performs a comparison and judgment instruction to the comparing and judging section 29. Then, the instruction to the calculating portion 47 and the making portion 48 is performed on the basis of the judgment result from the comparing and judging section 29.

When it is judged that the page setting has been performed, the analyzing portion 46 judges that the adjustment of the image size is unnecessary, performs size setting of print region, and then instructs the making portion 48 to make the PDF file.

The calculating portion 47 calculates magnification/reduction rate information for the magnifying/reducing process of the image data that is contained in the PDF file. In the present embodiment, the calculating portion 47 performs the calculation of magnification/reduction rate information on the basis of the page size information that was obtained by the first obtaining section 27 and the fed-paper size information that was obtained by the second obtaining section 28.

The making portion 48 makes the image data that is contained in the PDF file; generates print intermediate data; stores the print intermediate data in the intermediate data buffer 22; and instructs the expanding section 49 to expand the print intermediate data.

In the present embodiment, the making portion 48 makes the image data to the print intermediate data on the basis of the paper size that was set. Further, after the magnification/reduction rate information was informed from the calculating portion 47, the making portion 48, as a magnification/reduction generating section, magnifies/reduces the image data on the basis of the magnification/reduction rate information, and generates the print intermediate data that corresponds to the paper size.

The expanding section 49, after obtained the expansion instruction from the editing section 45, reads out the print intermediate data from the intermediate data buffer 22, and performs the expanding process to the print image data of the print intermediate data. Then, the expanding section 49 stores the print image data in the first image data buffer 42; and instructs the adjusting section 44 to adjust the size of the print image data.

The first image data buffer 42 is a temporarily storing section in which the print image data is temporarily stored that was expanded and generated by the expanding section 49.

The second image data buffer 43 is a temporarily storing section in which the print image data inside of region is temporarily stored that was adjusted and generated by the adjusting section 44 stated later.

The adjusting section 44, as shown by FIG. 14, has an existence/inexistence judging portion 50, an extracting portion 51 and a reducing portion 52, adjusts size of print image data on the basis of the size adjustment instruction from the expanding section 49, and is a processing section that generates print image data inside of region.

The existence/inexistence judging portion 50 reads out the print image data from the first image data buffer 42, and judges existence/inexistence of drawing image in the outside of the print region of the print image data. The existence/inexistence judging portion 50 judges existence/inexistence of drawing image in the outside of the print region on the basis of the informed of print region size information from the second obtaining section 28. The existence/inexistence judging portion 50, when it is judged that there is drawing data, performs a reduction instruction in the reducing portion 52; and when it is judged that there is no drawing data, performs an extraction instruction in the extracting portion 51.

The extracting portion 51 extracts the print data inside of region that corresponds to the print region from the print image data. The extracting portion 51 stores the print data inside of region in the second image data buffer 43; and instructs the engine controlling section 25 to start the print.

The reducing portion 52, as a magnification/reduction generating section, reduces the print image data on the basis of the reduction instruction from the existence/inexistence judging portion 50, and generates the print data inside of region corresponding to the print region. The reducing portion 52 calculates reduction rate information on the basis of the paper size information and the print region size information that were informed from the second obtaining section 28, and performs the reduction to the print data inside of region of the print image data on the basis of the reduction rate information. Then, the reducing portion 52 stores the print data inside of region in the second image data buffer 43; and instructs the engine controlling section 25 to start the print.

The second obtaining section 53 instructs the engine controlling section 25 to perform a size detection, and obtains the fed-paper size information. Then, the second obtaining section 53 obtains paper distinguishment number corresponding to the fed-paper size information from the paper list table 26 (FIG. 4), and informs the comparing and judging section 29 of it.

Further, the second obtaining section 53, as a third obtaining section, obtains the fed-paper size information and the corresponding print region size information, and informs the adjusting section 44 of it.

Next, it is to explain operation of the printer 40 of the present embodiment.

Here, firstly, it is to perform an explanation about a flow of an analyzing and editing process of receiving data in the controller unit 41.

Figure 15:
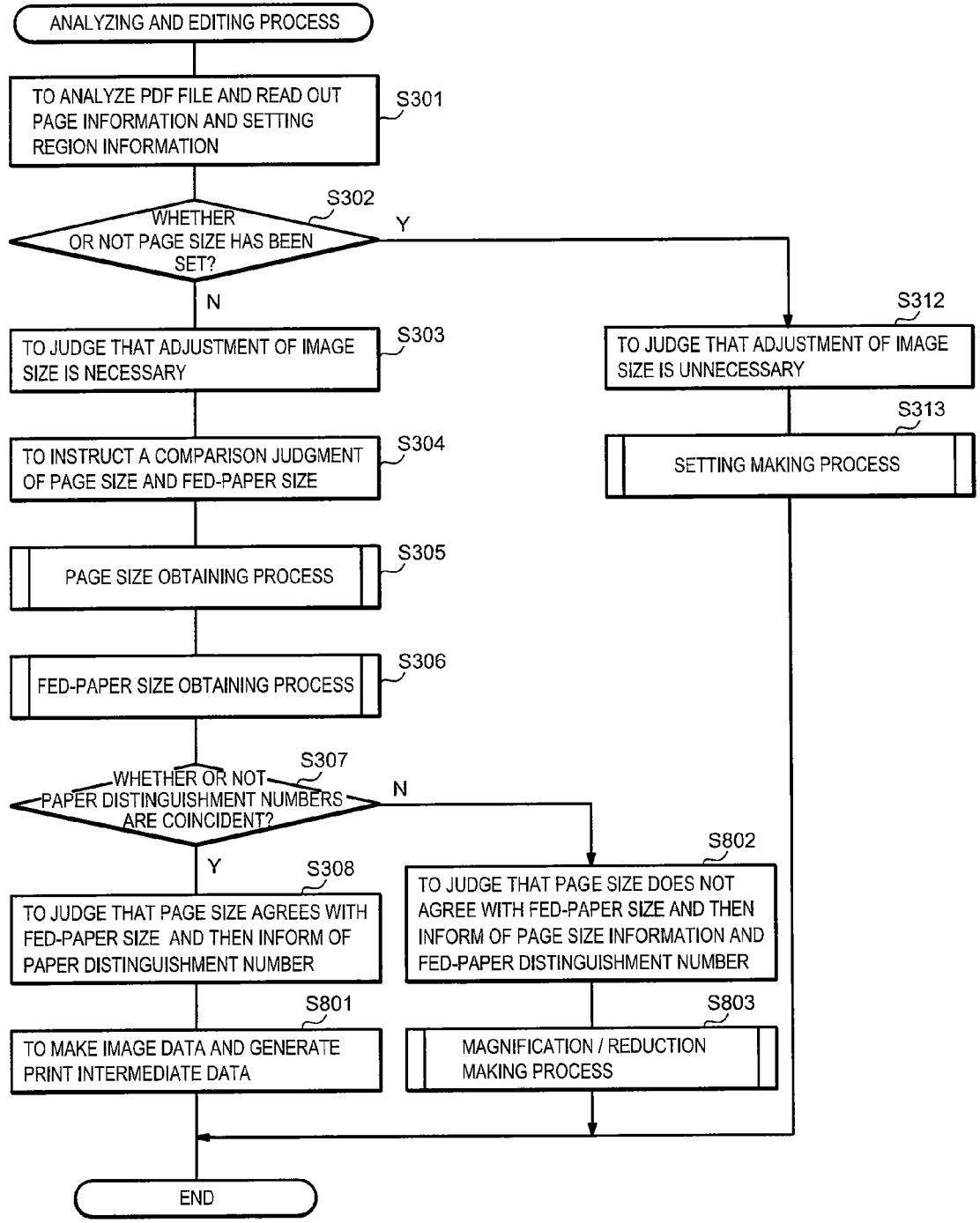
FIG. 15 is a flow chart for explaining an analyzing and editing operation in embodiment 2 of controller unit of the present invention.

FIG. 15 is a flow chart for explaining an analyzing and editing operation in embodiment 2 of controller unit of the present invention.

Firstly, it is to perform an explanation about a flow of an analyzing and editing process in the case that page size has not been set in the host computer 11, and an example in the case that the page size of the PDF file agrees with the fed-paper size of the paper feeding tray 14.

Moreover, because the flows of the page size obtaining process through the first obtaining section 27 and the fed-paper size obtaining process through the second obtaining section 28 are respectively the same as the flows in the embodiment 1 in the controller unit 41 of the printer 40 of the present embodiment, so the explanations are omitted.

In the controller unit 41, after the editing section 45 receives the direct print instruction from the receiving section 15, the analyzing portion 46 performs the analysis of the PDF file (FIG. 2) (Step S301). The analyzing portion 46 reads out the setting region information and the page information from the PDF file (Step S301), and judges an existence/inexistence of setting of page size (Step S302).

When it is judged that the page size has not been set (Step S302), the analyzing portion 46 judges that the adjustment of the image size is necessary (Step S303), and sends the comparison and judgment instruction to the comparing and judging section 29 in order to compare the page size of the PDF file that becomes the print object with the fed-paper size of the paper feeding tray 14 (Step S304).

The comparing and judging section 29 sends a receiving instruction to the first obtaining section 27 on the basis of the comparison and judgment instruction from the editing section 45. Then, the first obtaining section 27 performs the page size obtaining process (FIG. 4), obtains paper distinguishment number corresponding to the page size information, and informs the comparing and judging section 29 of the paper distinguishment number (Step S305).

Further, the comparing and judging section 29 sends the obtaining instruction to the second obtaining section 53. Then, the second obtaining section 53 performs the fed-paper size obtaining process (FIG. 5), obtains paper distinguishment number corresponding to the fed-paper size information, and informs the comparing and judging section 29 of the paper distinguishment number (Step S306).

Then, the comparing and judging section 29 performs the comparing and judging process of the informed of paper distinguishment number from the first obtaining section 27 and the informed of paper distinguishment number from the second obtaining section 53 (Step S307). The comparing and judging section 29, when it is judged that the paper distinguishment numbers are coincident (Step S307), judges that the page size agrees with the fed-paper size, and informs the editing section 45 of the judgment result and the agreeing paper distinguishment number (Step S308).

Then, the making portion 48 of the editing section 45 makes the image data of the PDF file, generates print intermediate data, and stores the print intermediate data in the intermediate data buffer 22 (Step S801). Thus, the analyzing and editing process is completed in the controller unit 41.

FIG. 16 is a diagram for explaining a making process to make data from image data to print intermediate data in embodiment 2.

Figures 16A, 16B:
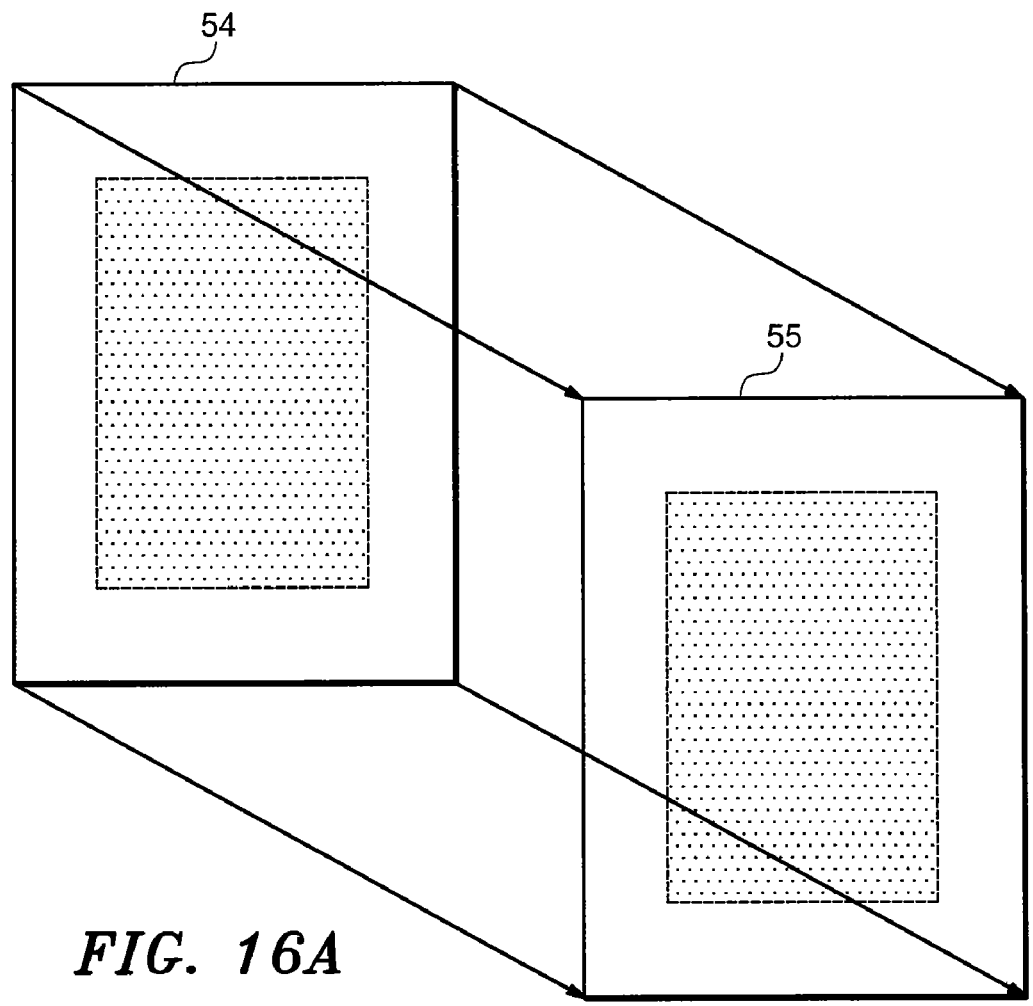
FIG. 16 is a diagram for explaining a making process to make data from image data to print intermediate data in embodiment 2.

FIG. 16A is a diagram showing a page image based on image data that is contained in the PDF file. FIG. 16B is a diagram showing a page image based on print intermediate data after the analyzing and editing process. In the FIG. 16B, a rectangular region 55 has region size that agrees with the fed-paper size.

As stated above, when the page size agrees with the fed-paper size, that is, when the size of the page image 54 that is shown by FIG. 16A agrees with the size of paper in the paper feeding tray 14, the image data that is contained in the PDF file is made in the same rate, as shown by FIG. 16B, the print intermediate data corresponding to the fed-paper size is generated.

When the page size does not agree with the fed-paper size, in Step S307, the comparing and judging section 29 judges that the paper distinguishment numbers are not agree.

On the basis of this judgment result, the comparing and judging section 29 judges that the page size does not agree with the fed-paper size, and informs the editing section 45 of the page size information that was obtained by the first obtaining section 27 and the fed-paper size information that was obtained by the second obtaining section 53 (Step S802).

Then, the calculating portion 47 and the making portion 48 of the editing section 45 magnification/reduction makes the image data on the basis of the page size information and the fed-paper size information that were informed, and generates print intermediate data (Step S803). Thus, the analyzing and editing process is completed in the controller unit 41. The flow of the magnification/reduction making process is stated later.

Moreover, in the Step S302, when it is judged that the page size has been set, the analyzing portion 46 judges that the adjustment of the image size is unnecessary (Step S312). Then, the making portion 48 performs the setting making process (FIG. 12) of the PDF file that is the same as the embodiment 1 on the basis of the page information and the setting region information, generates print intermediate data, and stores the print intermediate data in the intermediate data buffer 22 (Step S313).

Figure 17:
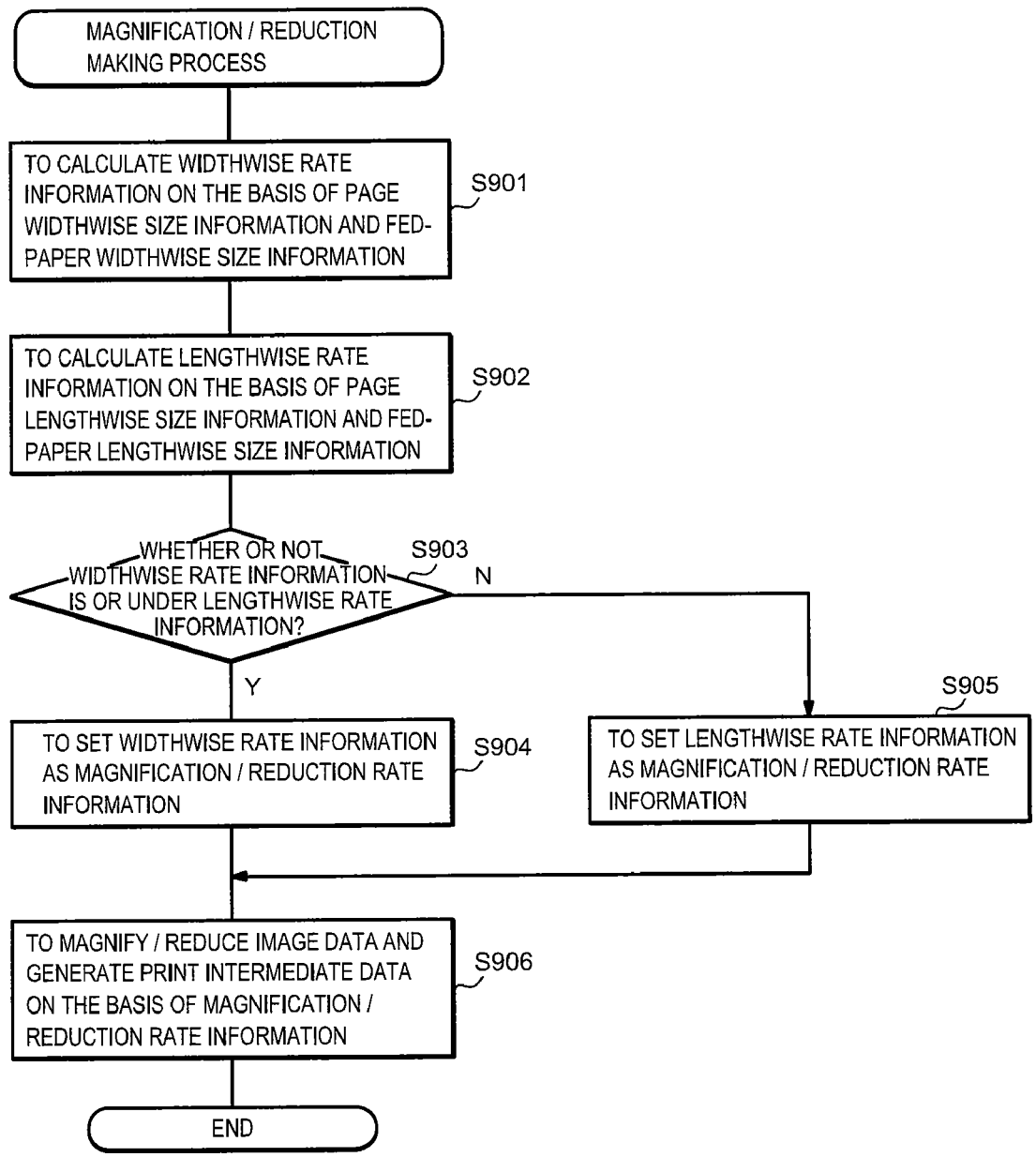
FIG. 17 is a flow chart for explaining a magnification/reduction making operation in embodiment 2 of controller unit of the present invention.

Next, it is to explain a magnification/reduction making process from image data to print intermediate data that is performed in the editing section 45 of the controller unit 41 by using FIG. 16 and FIG. 17.

FIG. 17 is a flow chart for explaining a magnification/reduction making operation in embodiment 2 of controller unit of the present invention.

Moreover, the magnification/reduction making process corresponds to operation of the Step S803 in the FIG. 15.

Before the magnification/reduction making process is performed, the comparing and judging section 29 of the controller unit 41 informs the editing section 45 of the page widthwise size information "x1" and the page lengthwise size information "y1" that were obtained by the first obtaining section 27 and the fed-paper widthwise size information "x3"

and the fed-paper lengthwise size information "y3" that were obtained by the second obtaining section 53.

In the FIG. 16A, the page widthwise size information "x1" represents the length between the top point "54A" and the top point "54B" of the page image 54; and the page lengthwise size information "y1" represents the length between the top point "54A" and the top point "54C". Further, in the FIG. 16B, the fed-paper widthwise size information "x3" corresponds to the length between the top point "55A" and the top point "55B" of the rectangular region 55; and the fed-paper lengthwise size information "y3" corresponds to the length between the top point "55A" and the top point "55C".

Because the region size, i.e. the page size of the image data of the page image 54 does not agree with the region size, i.e. the fed-paper size of the rectangular region 55, the editing section 45 performs the magnification/reduction of the image size so that the page image 54 is accommodated in the rectangular region 55.

In the editing section 45, the calculating portion 47, firstly, calculates R'x=x3/x1 as widthwise rate information "R'x" on the basis of the page widthwise size information "x1" and the fed-paper widthwise size information "x3" (Step S901).

Further, the calculating portion 47 calculates R'y=y3/y1 as lengthwise rate information "R'y" on the basis of the page lengthwise size information "y1" and the fed-paper lengthwise size information "y3" (Step S902).

Then, the calculating portion 47 compares the widthwise rate information "R'x" with the lengthwise rate information "R'y" that were calculated, and judges whether or not the widthwise rate information "R'x" is or under the lengthwise rate information "R'y" (Step S903).

When it is R'x≦R'y (Step S903), the calculating portion 47 sets the widthwise rate information "Rx" as magnification/reduction rate information "R'" (Step S904). Further, when it is R'x>R'y (Step S903), the calculating portion 47 sets the lengthwise rate information "R'y" as magnification/reduction rate information "R'" (Step S905). The making portion 48 is informed of the magnification/reduction rate information "R'" that was set.

Then, the making portion 48 performs the magnifying/reducing process of the image data that is contained in the PDF file on the basis of the informed of magnification/reduction rate information "R'", and generates print intermediate data (Step S906). The making portion 48 magnifies/reduces the page image 54 (FIG. 16A) "R'" times, generates print intermediate data of size that is accommodated in the rectangular region 55 (FIG. 16B) of the fed-paper size, and stores the print intermediate data in the intermediate data buffer 22 (Step S906). Thus, the magnification/reduction making process is completed in the controller unit 41.

As stated above, the image data of the PDF file is magnified/reduced to correspond to the fed-paper size, and the print intermediate data is generated.

Figure 18:
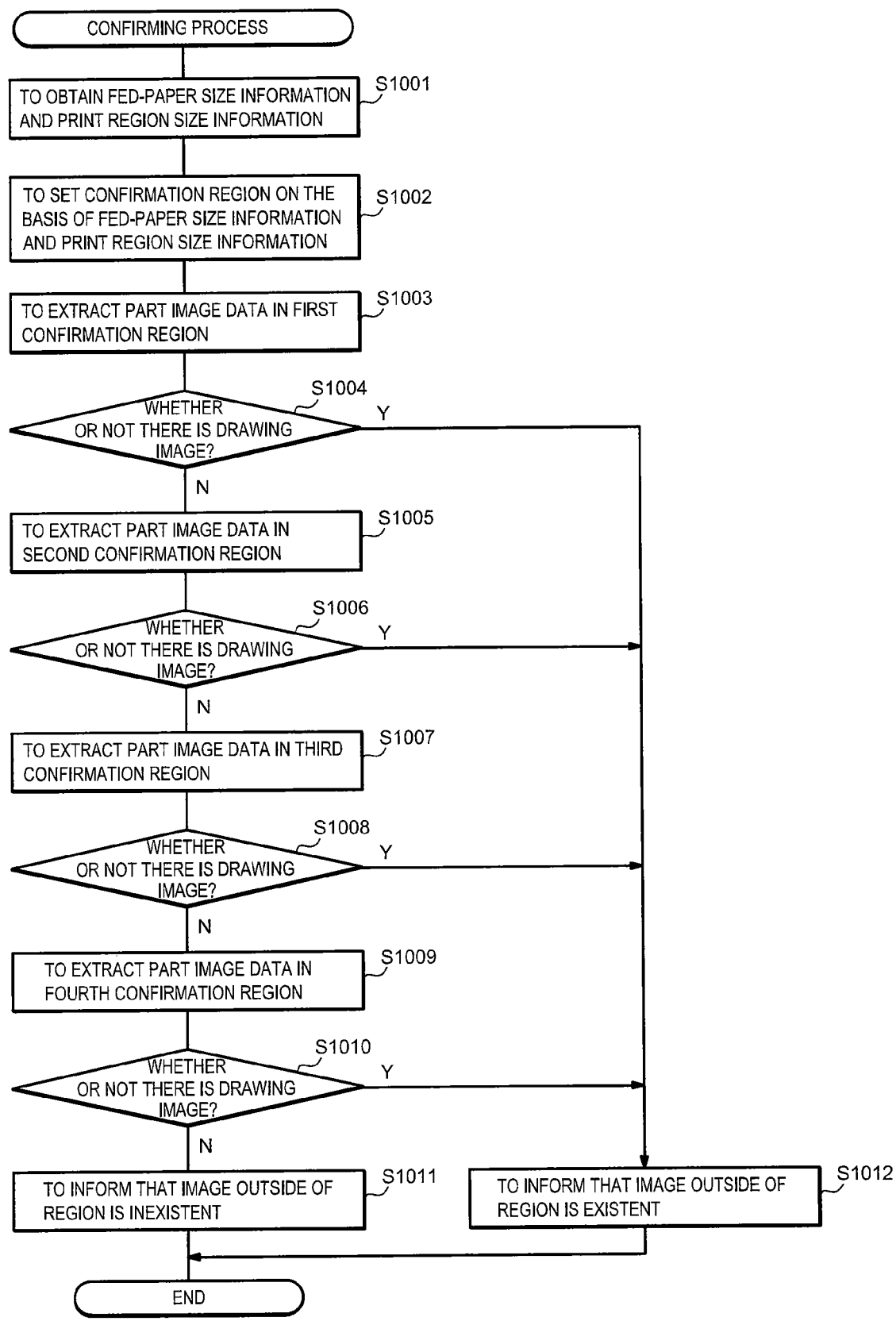
FIG. 18 is a flow chart for explaining a confirming operation in embodiment 2 of controller unit of the present invention.

It is to explain a flow of a confirming process that is performed before the size adjustment of the print image data by using FIG. 18 in the adjusting section 44 of the controller unit 41.

FIG. 18 is a flow chart for explaining a confirming operation in embodiment 2 of controller unit of the present invention.

In the controller unit 41, after the adjusting section 44 receives an adjustment instruction from the expanding section 23, the existence/inexistence judging portion 50 performs a confirming process that is shown below in order to judge existence/inexistence of drawing data in the outside of the print region in the print image data.

The existence/inexistence judging portion 50, firstly, instructs the second obtaining section 53 to obtain the fed-paper size information and the print region size information. The second obtaining section 53 obtains the fed-paper size information through the engine controlling section 25 on the basis of the obtaining instruction (Step S1001). Further, the second obtaining section 53 refers to the paper list table 26, and reads out and obtains the print region size information corresponding to the fed-paper size information (Step S1001). Then, the second obtaining section 53 informs the adjusting section 44 of the fed-paper size information and the print region size information that were obtained (Step S1001). The explanation about the detailed obtaining process of the print region size information in the second obtaining section 53 is omitted.

After the fed-paper size information and the print region size information are informed, the existence/inexistence judging portion 50 performs a setting of the confirming process on the basis of the fed-paper size information and the print region size information (Step S1002).

Figure 19:
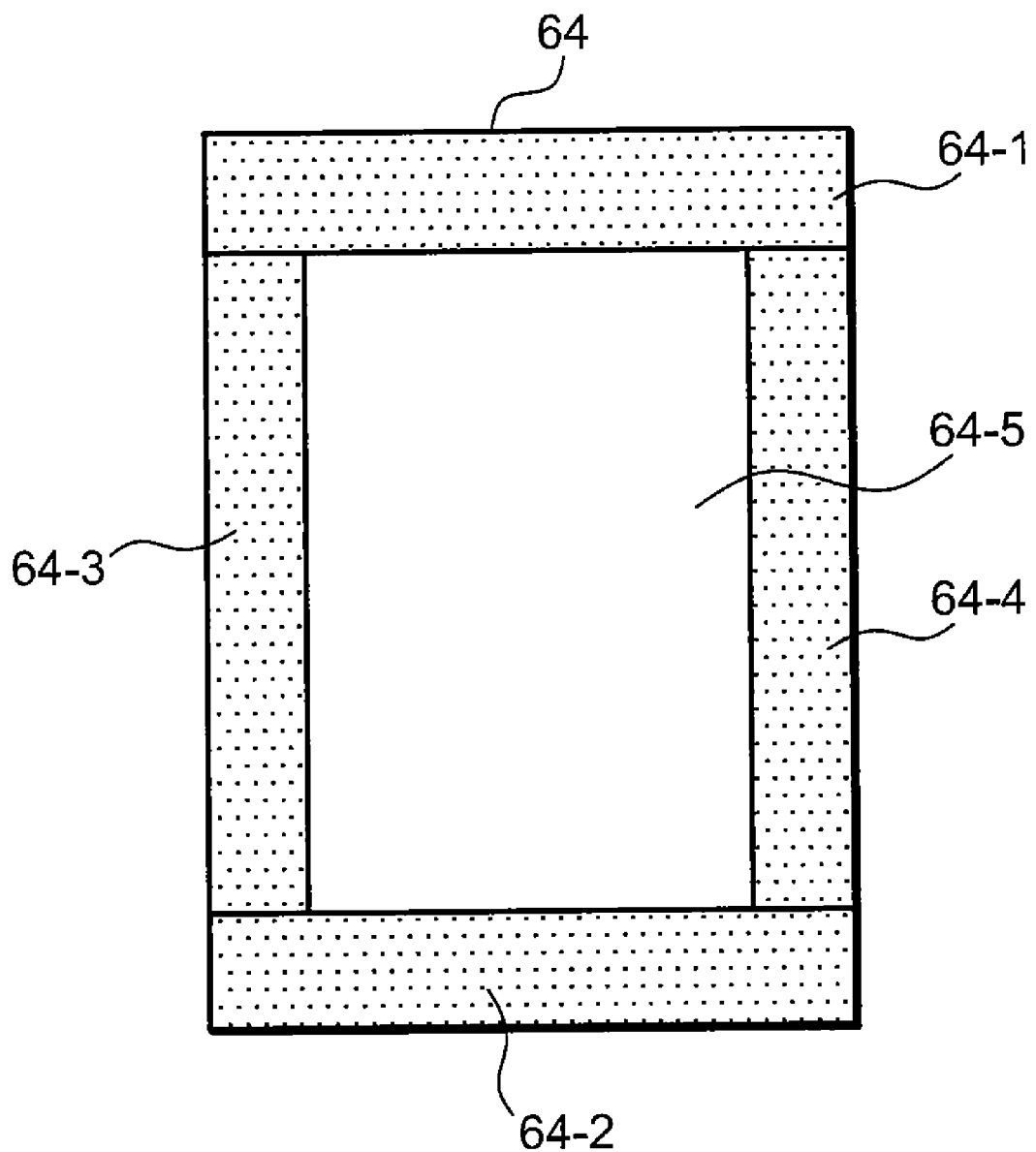
FIG. 19 is a diagram showing a setting example of confirmation region.

FIG. 19 is a diagram showing a setting example of confirmation region.

In the FIG. 19, a rectangular region 64 is a region that has page size of print image data. The page size agrees with the fed-paper size.

A part region 64-5 that has been arranged at the center of the rectangular region 64 is a region of rectangular shape that has print region size. The rectangular region 64, furthermore, surrounds the part region 64-5, and has been divided by a part region 64-1 that is a region of rectangular shape that is arranged at the upper part, a part region 64-1 that is a rectangular region that is arranged at the under part, a part region 64-3 and 64-4 that are rectangular regions that are respectively arranged at the both sides.

The existence/inexistence judging portion 50 sets respective part regions 64-1~4 expect the part region 64-5 corresponding to the print region as a first confirmation region, a second confirmation region, a third confirmation region and a fourth confirmation region (Step S1002). That is, the existence/inexistence judging portion 50 divides the print image data into four confirmation regions and one print region.

Then, the existence/inexistence judging portion 50, firstly, extracts part image data corresponding to the first confirmation region from the print image data (Step S1003), and judges existence/inexistence of drawing image in the part image data (Step S1004).

When it is judged that there is no drawing image in the first confirmation region (Step S1004), the existence/inexistence judging portion 50, continuously, extracts part image data corresponding to the second confirmation region from the print image data (Step S1005), and judges an existence/inexistence of drawing image in the part image data (Step S1006).

When it is judged that there is no drawing image in the second confirmation region (Step S1006), the existence/inexistence judging portion 50, furthermore, extracts part image data corresponding to the third confirmation region from the print image data (Step S1007), and judges an existence/inexistence of drawing image in the part image data (Step S1008).

Then, when it is judged that there is no drawing image in the third confirmation region (Step S1008), the existence/inexistence judging portion 50, furthermore, extracts part image data corresponding to the fourth confirmation region from the print image data (Step S1009), and judges existence/inexistence of drawing image in the part image data (Step S1010).

When it is judged that there is also no drawing image in the fourth confirmation region (Step S1010), the existence/inexistence judging portion 50 judges that there are no drawing image in respective confirmation regions. Then, the existence/inexistence judging portion 50 judges that there is no drawing image, i.e. image outside of region in the outside range of the print region, and informs the extracting portion 51 of the judgment result (Step S1011). Thus, the confirming process is completed in the existence/inexistence judging portion 50.

Moreover, when it is judged that there is drawing image in any of respective confirmation regions (Step S1004, S1006, S1008, S1010), the existence/inexistence judging portion 50 judges that there is drawing image, i.e. image outside of region in the outside range of the print region, and informs the reducing portion 52 of the judgment result (Step S1012). Thus, the confirming process is completed in the existence/inexistence judging portion 50.

As stated above, the existence/inexistence of data outside of region in the print image data is judged.

Next, it is to explain a flow of a direct print process in the printer 40 of the present embodiment.

Figure 20:
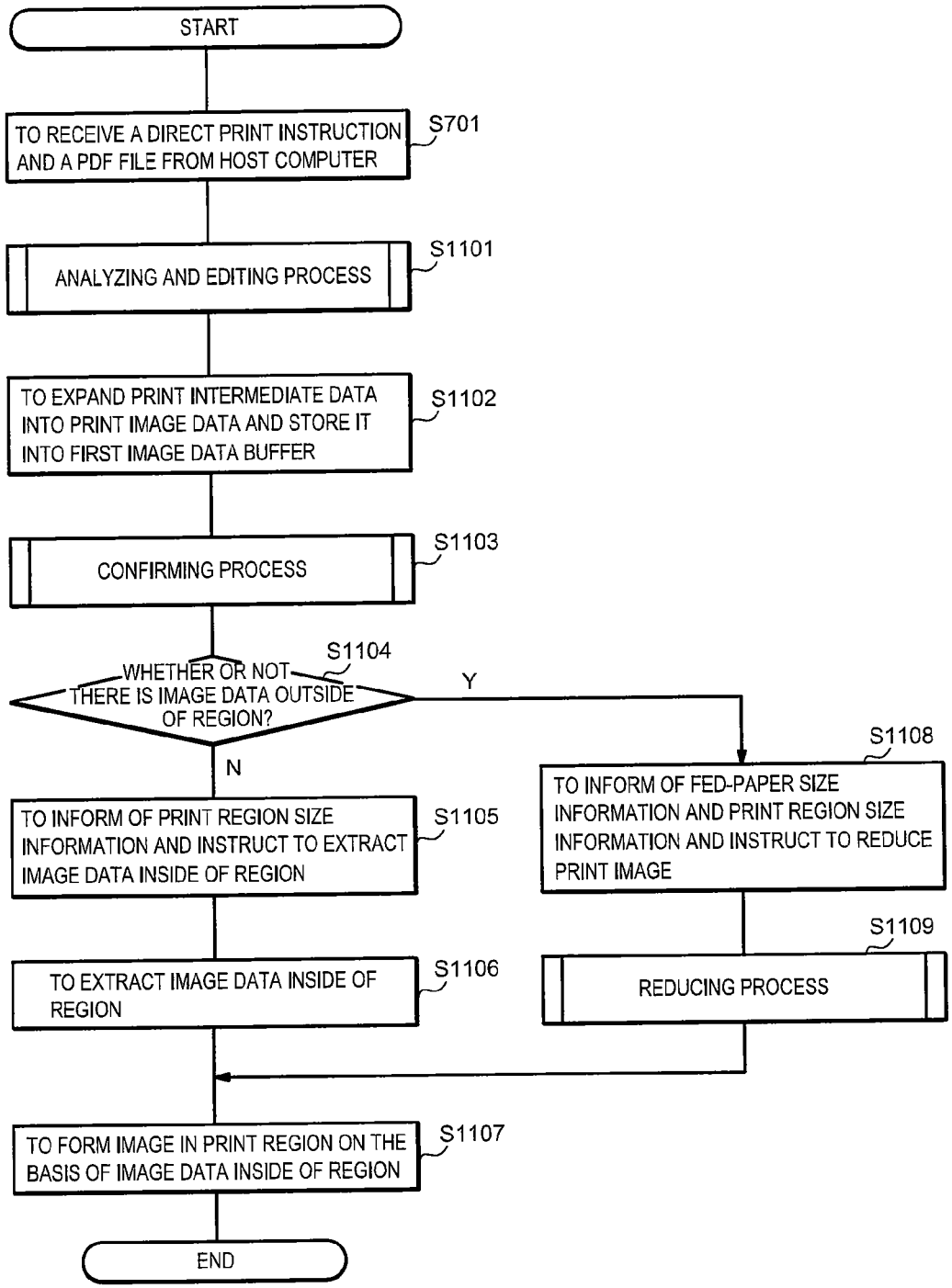
FIG. 20 is a flow chart for explaining direct print operation in embodiment 2 of printer comprising controller unit of the present invention.

FIG. 20 is a flow chart for explaining direct print operation in embodiment 2 of printer comprising controller unit of the present invention.

In the printer 40, the receiving section 15 of the controller unit 41, after received the direct print instruction and the PDF file from the host computer 11 (Step S701), the receiving section 15 stores the PDF file in the receiving buffer 16, and sends the direct print instruction to the editing section 45.

Then, in the controller unit 41, the analyzing and editing process (FIG. 15) of the PDF file is performed (Step S1101). The editing section 45, after it analyzes and edits the PDF file, and generates print intermediate data, stores the print intermediate data in the intermediate data buffer 22; and sends the expansion instruction of the print intermediate data to the expanding section 23 (Step S1101).

The expanding section 23 reads out and expands the print intermediate data from the intermediate data buffer 22 on the basis of the expansion instruction, and generates print image data (Step S1102). Then, the expanding section 23 stores the print image data in the first image data buffer 42; and instructs the adjusting section 44 to adjust the print image data (Step S1102).

After the adjusting section 44 receives the adjustment instruction, the existence/inexistence judging portion 50 performs the confirming process (FIG. 18) in order to judge the existence/inexistence of drawing data in the outside range of the print region in the print image data (Step S1103). The existence/inexistence judging portion 50 divides the print image data into five part image data, and performs the confirming process.

Then, the existence/inexistence judging portion 50 judges whether or not there is drawing data, i.e. image data outside of region in the outside range of the print region (Step S1104).

When it is judged that there is no image data outside of region (Step S1104), the existence/inexistence judging portion 50 informs the extracting portion 51 of the print region size information, and instructs to extract the image data inside of region (Step S1105).

The extracting portion 51 reads out the print image data from the first image data buffer 42 on the basis of the extraction instruction. Then, the extracting portion 51 extracts the image data in the print region as the image data inside of region from the print image data of the fed-paper size on the basis of the informed of print region size information (Step S1106).

FIG. 21 is a diagram for explaining an extracting process of print image data in embodiment 2.

Figures 21A, 21B:
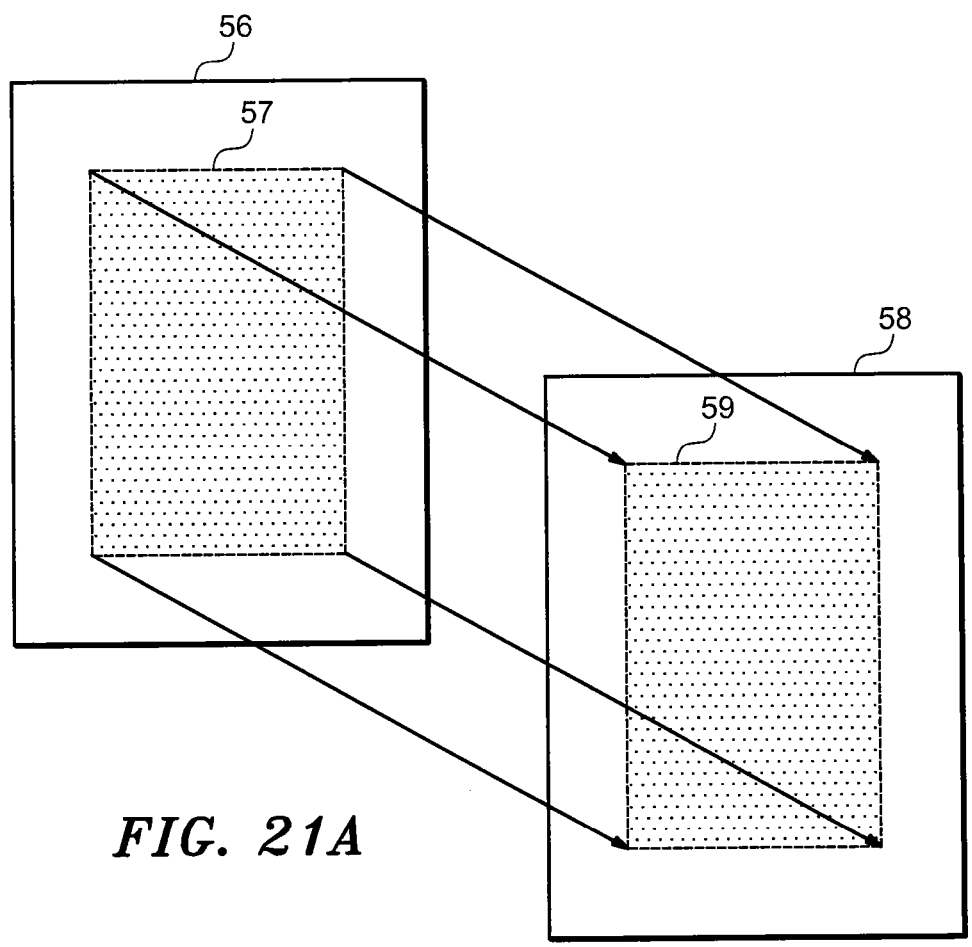
FIG. 21 is a diagram for explaining an extracting process of print image data in embodiment 2.

FIG. 21A is a diagram showing a page image based on the print image data.

The page size of a page image 56 is adjustment end by the editing section 45 in order to agree with the fed-paper size.

The extracting portion 51 extracts the image data in the print region 57 as the image data inside of region from the print image data corresponding to the page image 56 (Step S1106). The extracting portion 51 stores the extracted image data inside of region in the second image data buffer 43; and instructs the engine controlling section 25 to start the print (Step S1106).

The engine controlling section 25, after received the print start instruction, reads out image data inside of region from the second image data buffer 43, and sends the image data inside of region and the print instruction to the engine section 13. Then, the engine section 13 forms image in the print region of paper that was paper fed from the paper feeding tray 14, and performs the print (Step S1107). Thus, the direct print process is completed in the printer 40.

FIG. 21B is a diagram showing a page image based on the image data inside of region after the extracting process.

In a print region 59 of a paper 58 that was paper fed from the paper feeding tray 14, an image based on the image data inside of region that was extracted from the print image data is formed in the same times without being magnified/reduced.

Moreover, in the Step S1104, when it is judged that there is print data outside of region, the existence/inexistence judging portion 50 informs the reducing portion 52 of the fed-paper size information and the print region size information, and instructs to reduce the print image data (Step S1108).

The reducing portion 52 performs a reducing process of the print image data on the basis of a reduction instruction, and generates image data inside of region (Step S1109).

Figure 22:
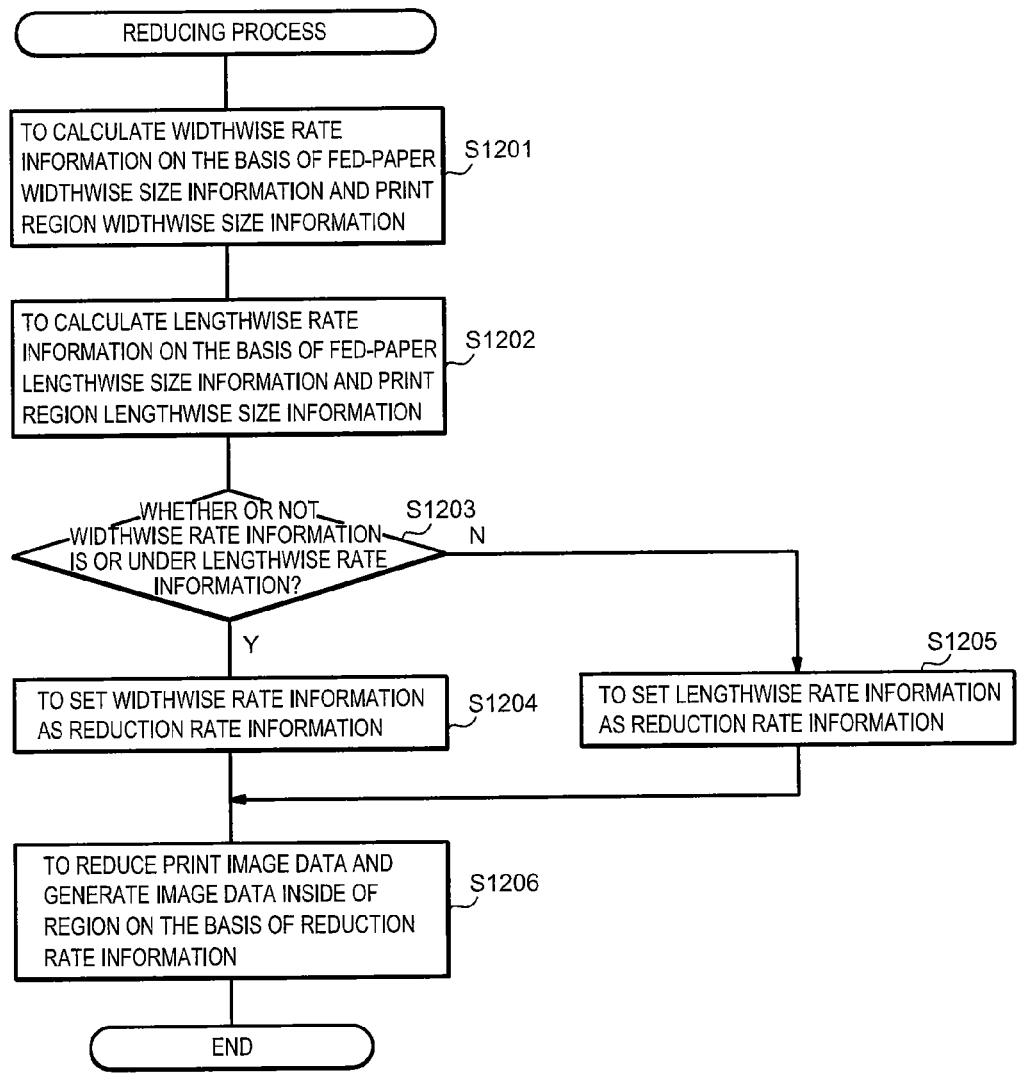
FIG. 22 is a flow chart for explaining a reducing operation of controller unit of the present invention.

Here, it is to explain a flow of a reducing process in the Step S1109 by using FIG. 22 and FIG. 23.

FIG. 22 is a flow chart for explaining a reducing operation of controller unit of the present invention; and FIG. 23 is a diagram for explaining a reducing process of print image data in embodiment 2.

In the adjusting section 44 of the controller unit 41, the reducing portion 52, after informed of the fed-paper size information that is composed of the fed-paper widthwise size information "x3" and the fed-paper lengthwise size information "y3", and the print region size information that is composed of the print region widthwise size information "x2" and the print region lengthwise size information "y2" from the existence/inexistence judging portion 50, performs the magnification/reduction of the print image data.

Figures 23A, 23B:
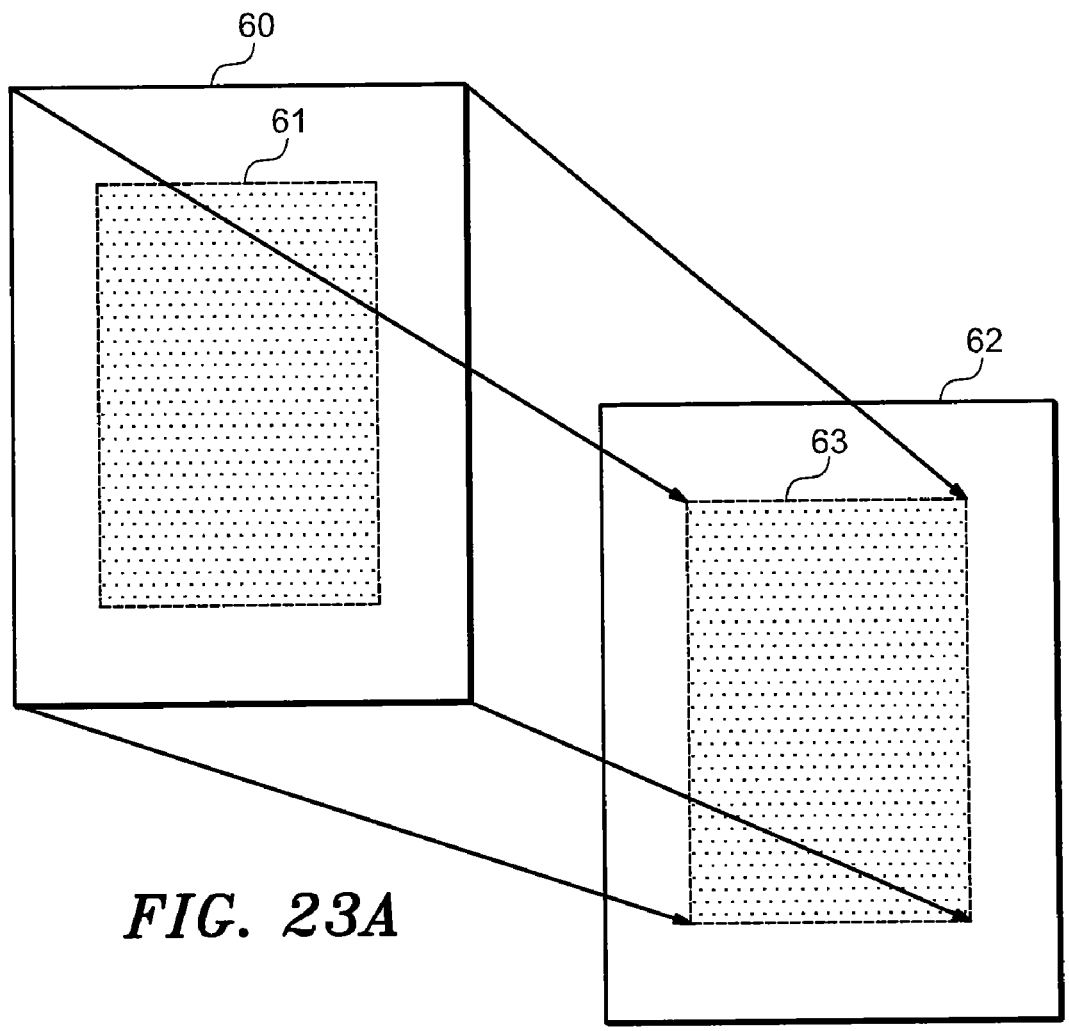
FIG. 23 is a diagram for explaining a reducing process of print image data in embodiment 2.

FIG. 23A is a diagram showing a page image based on the print image data; and FIG. 23B is a diagram showing a page image based on the image data inside of region.

In the FIG. 23A, a page image 60 is formed from a rectangular region of the fed-paper size; and a rectangular region 61 has print region corresponding to the fed-paper size. Here, the print image data corresponding to the page image 60 also has drawing data, i.e. data outside of region at the outside of the rectangular region 61. Therefore, after the printing process is performed on the basis of the print image data, there is a problem that drawing based on the data outside of region is not executed.

Therefore, the reducing portion 52 reduces the print image data so that the page image 60 is accommodated in a print region 63 of a paper 62 that is shown by FIG. 23B.

Firstly, the reducing portion 52 calculates $rx=x2/x3$ as widthwise rate information "rx" on the basis of the fed-paper widthwise size information "x3" and the print region widthwise size information "x2" (Step S1201).

Further, the reducing portion 52 calculates ry=y2/y3 as lengthwise rate information "ry" on the basis of the fed-paper lengthwise size information "y3" and the print region lengthwise size information "y2" (Step S1202).

Then, the reducing portion 52 compares the widthwise rate information "rx" with the lengthwise rate information "ry", and judges whether or not the widthwise rate information "rx" is or under the lengthwise rate information "ry" (Step S1203).

When it is rx≦ry (Step S1203), the reducing portion 52 sets the widthwise rate information "rx" as reduction rate information "r" (Step S1204). Further, when it is rx>ry (Step S1203), the reducing portion 52 sets the lengthwise rate information "ry" as reduction rate information "r" (Step S1205).

Continuously, the reducing portion 52 reduces the print image data on the basis of the set reduction rate information "r", and generates the image data inside of region corresponding to the print region (Step S1206). The reducing portion 52 reduces the page image 60 (FIG. 23A) "r" times, generates data inside of region of the size that is accommodated in the print region 63 (FIG. 23B), and stores it in the second image data buffer 43 (Step S1206). Thus, the reducing process is completed in the controller unit 41.

As stated above, the print image data is reduced to correspond to the print region, and the image data inside of region is generated.

Returning to the FIG. 20, the reducing portion 52, after storing the image data inside of region in the second image data buffer 43 (Step S1109), instructs the engine controlling section 25 to start the print.

Then, the engine controlling section 25 reads out image data inside of region from the second image data buffer 43, and sends the image data inside of region and the print instruction to the engine section 13. Continuously, the engine section 13 forms an image in the print region of paper that was paper fed from the paper feeding tray 14 on the basis of the image data inside of region that was received, and performs the print (Step S1107). Thus, the direct print process is completed in the printer 40.

As stated above, in the printer 40, the direct print process based on the PDF file is executed.

As stated above, according to the printer 40 on which the controller unit 41 of the present embodiment is installed, in the case to adjust image size, because it is considered whether or not drawing data, i.e. data outside of region at the outside of the print region is existent, so unnecessary image reduction is prevented; and the loss of data outside of region is really prevented.

The Utilization Possibility on Industry:

In respective embodiments stated above, the present invention is applied to the controller section of the print apparatus that executes the direct print on the basis of the electronic document that was sent from the upper apparatus. However, the present invention is not limited in the case. For example, it can also be applied to MFP that performs the print on the basis of the image data that was read in the scanner.

The present invention is not limited to the foregoing embodiments but many modifications and variations are possible within the spirit and scope of the appended claims of the invention.

What is claimed is:

1. A print controlling apparatus which includes an inputting section for inputting image data of electronic document and an expanding section for expanding the inputted image data into print data, and is used for printing the electronic document onto record medium, comprising:

a first obtaining section that obtains page size information representing page size of the electronic document;

a second obtaining section that obtains medium size information representing medium size of the record medium;

a comparing and judging section that compares the page size information with the medium size information that were obtained, and judges whether or not the page size information agrees with the medium size information; and an extracting section that, when the page size information is judged to agree with the medium size information, extracts image data inside of region corresponding to print region of the record medium from the image data, wherein the expanding section expands the extracted image data inside of region, and generates print data inside of region corresponding to the print region.

2. The print controlling apparatus according to claim 1, further comprising:

a printing section that prints in the print region and executes a print on the basis of the generated print data inside of region.

3. The print controlling apparatus according to claim 1, wherein the inputting section includes a reading and obtaining section that reads manuscript image of the electronic document and obtains the image data.

4. The print controlling apparatus according to claim 1, wherein the inputting section includes a receiving section that receives the image data from upper apparatus.

5. The print controlling apparatus according to claim 1, wherein the comparing and judging section judges that the page size information agrees with the medium size information, when a size difference between the page size information and the medium size information becomes or under a threshold value.

6. The print controlling apparatus according to claim 1, Wherein, when the comparing and judging section judged that the page size information agrees with the medium size information, the expanding section expands the image data and generates print data corresponding to the record medium, the extracting section extracts print data inside of region corresponding to the print region from the generated print data.

7. The print controlling apparatus according to claim 1, further comprising:

an existence/inexistence judging portion that is used for judging existence/inexistence of drawing image in a predetermined region, wherein, when the comparing and judging section judged that the page size information agrees with the medium size information, the expanding section expands the image data and generates print data corresponding to the record medium, the existence/inexistence judging portion judges existence/inexistence of drawing image outside of the print region of the generated print data, when the existence/inexistence judging portion judged that the drawing image is inexistent, the extracting section extracts print data inside of region corresponding to the print region from the generated print data.

8. The print controlling apparatus according to claim 7, further comprising:

a third obtaining section that obtains region size information representing region size of the print region when the existence/inexistence judging portion judged that the drawing image is existent; and a magnification/reduction generating section that magnifies/reduces the print data according to the region size and generates print data inside of region on the basis of the region size information and the page size information that were obtained.

9. The print controlling apparatus according to claim 8, wherein the magnification/reduction generating section has a calculating portion that calculates rate information representing a magnification/reduction rate of the print data on the basis of the region size information and the page size information, and performs a magnification/reduction of the print data toward the print data inside of region on the basis of the calculated rate information.

10. The print controlling apparatus according to claim 1, further comprising:
a third obtaining section that obtains region size information representing region size of the print region when the comparing and judging section judged that the page size information does not agree with the medium size information; and
a magnification/reduction generating section that magnifies/reduces the image data according to the region size and generates magnification/reduction image data on the basis of the region size information and the page size information that were obtained,
wherein the expanding section expands the generated magnification/reduction image data and generates print data inside of region corresponding to the print region.

11. The print controlling apparatus according to claim 10, wherein the magnification/reduction generating section has a calculating portion that calculates rate information representing magnification/reduction rate of the image data on the basis of the region size information and the page size information, and performs a magnification/reduction of the image data toward the magnification/reduction image data on the basis of the calculated rate information.

12. The print controlling apparatus according to claim 1, further comprising:
a magnification/reduction generating section that magnifies/reduces the image data according to the medium size and generates magnification/reduction image data on the basis of the page size information and the medium size information when the comparing and judging section judged the page size information does not agree with the medium size information; and
an existence/inexistence judging portion that is used for judging existence/inexistence of drawing image in a predetermined region,
wherein the expanding section expands the generated magnification/reduction image data and generates print data corresponding to the record medium,
the existence/inexistence judging portion judges existence/inexistence of drawing image outside of the print region of the generated print data,
when the existence/inexistence judging portion judged that the drawing image is inexistent, the extracting section extracts print data inside of region corresponding to the print region from the print data.

13. The print controlling apparatus according to claim 12, wherein the magnification/reduction generating section has a calculating portion that calculates rate information representing magnification/reduction rate of the image data on the basis of the page size information and the medium size information, and performs magnification/reduction of the image data toward the magnification/reduction image data on the basis of the calculated rate information.

14. The print controlling apparatus according to claim 12, further comprising:
a third obtaining section that obtains region size information representing region size of the print region when the existence/inexistence judging portion judged that the drawing image is existent,
wherein the magnification/reduction generating section magnifies/reduces the print data according to the region size and generates print data inside of region on the basis of the region size information and the medium size information that were obtained.

15. The print controlling apparatus according to claim 14, wherein the magnification/reduction generating section has a calculating portion that calculates rate information representing magnification/reduction rate of the print data on the basis of the region size information and the medium size information, and performs magnification/reduction of the print data toward the print data inside of region on the basis of the calculated rate information.

* * * * *